(12) United States Patent
Liu et al.

(10) Patent No.: US 12,249,076 B2
(45) Date of Patent: Mar. 11, 2025

(54) THREE-DIMENSIONAL EDGE DETECTION BASED ON MUTUAL OBJECT AND EDGE DETECTION AND THREE-DIMENSIONAL EDGE REFINEMENT DETECTION

(71) Applicant: Tencent Technology (Shenzhen) Company Limited, Guangdong (CN)

(72) Inventors: Luyan Liu, Shenzhen (CN); Kai Ma, Shenzhen (CN); Yefeng Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 341 days.

(21) Appl. No.: 17/703,829

(22) Filed: Mar. 24, 2022

(65) Prior Publication Data

US 2022/0215558 A1    Jul. 7, 2022

Related U.S. Application Data

(63) Continuation of application No. PCT/CN2020/121120, filed on Oct. 15, 2020.

(30) Foreign Application Priority Data

Feb. 20, 2020    (CN) .......................... 202010104850.1

(51) Int. Cl.
*G06T 7/13*    (2017.01)
*G06T 7/12*    (2017.01)
(Continued)

(52) U.S. Cl.
CPC ................. *G06T 7/13* (2017.01); *G06T 7/12* (2017.01); *G06T 7/90* (2017.01); *G06T 9/20* (2013.01);
(Continued)

(58) Field of Classification Search
None
See application file for complete search history.

(56) References Cited

U.S. PATENT DOCUMENTS

| 2013/0188708 A1* | 7/2013 | Rusert ................... H04N 13/10 |
| | | 375/240.12 |
| 2017/0213093 A1* | 7/2017 | Li ........................... G06N 3/08 |

(Continued)

FOREIGN PATENT DOCUMENTS

| CN | 108629788 A | 10/2018 |
| CN | 109410185 A | 3/2019 |

(Continued)

OTHER PUBLICATIONS

International Search Report and Written Opinion issued Jan. 14, 2021 in Application No. PCT/CN2020/121120 with English Translation.

(Continued)

*Primary Examiner* — Akwasi M Sarpong
*Assistant Examiner* — Pawan Dhingra
(74) *Attorney, Agent, or Firm* — ArentFox Schiff LLP

(57) ABSTRACT

A method for three-dimensional edge detection includes obtaining, for each of plural two-dimensional slices of a three-dimensional image, a two-dimensional object detection result and a two-dimensional edge detection result, stacking the two-dimensional object detection results into a three-dimensional object detection result, and stacking the two-dimensional edge detection results into a three-dimensional edge detection result. The method also includes performing encoding according to a feature map of the three-dimensional image, the three-dimensional object detection result, and the three-dimensional edge detection result, to obtain an encoding result, and performing decoding according to the encoding result, the three-dimensional object detection result, and the three-dimensional edge
(Continued)

detection result, to obtain an optimized three-dimensional edge detection result of the three-dimensional image.

18 Claims, 6 Drawing Sheets

(51) Int. Cl.
*G06T 7/90* (2017.01)
*G06T 9/20* (2006.01)
*G06V 10/56* (2022.01)
*G06V 20/64* (2022.01)

(52) U.S. Cl.
CPC ............ *G06V 10/56* (2022.01); *G06V 20/647* (2022.01); *G06T 2200/04* (2013.01); *G06T 2207/10012* (2013.01); *G06T 2207/10024* (2013.01); *G06T 2207/20021* (2013.01); *G06T 2207/20081* (2013.01)

(56) References Cited

U.S. PATENT DOCUMENTS

| | | |
|---|---|---|
| 2018/0052251 A1 | 2/2018 | Cao |
| 2018/0137642 A1* | 5/2018 | Malisiewicz ........ G06V 10/454 |
| 2020/0014925 A1* | 1/2020 | Lim ................ H04N 19/176 |
| 2021/0099697 A1* | 4/2021 | Sugio ................ H04N 19/597 |
| 2022/0174300 A1* | 6/2022 | Li ..................... H04N 19/31 |

FOREIGN PATENT DOCUMENTS

| | | |
|---|---|---|
| CN | 109598722 A | 4/2019 |
| CN | 109872325 A | 6/2019 |
| CN | 110648337 A | 1/2020 |
| CN | 111325766 A | 6/2020 |
| WO | 2018183548 A1 | 10/2018 |

OTHER PUBLICATIONS

Liu Y, Cheng M M, Hu X, et al. Richer convolutional features for edge detection[C]//Proceedings of the IEEE conference on computer vision and pattern recognition. 2017: 3000-3009.
He J, Zhang S, Yang M, et al. Bi-Directional Cascade Network for Perceptual Edge Detection[C]//Proceedings of the IEEE Conference on Computer Vision and Pattern Recognition. 2019: 3828-3837.
Yu Z, Liu W, Zou Y, et al. Simultaneous edge alignment and learning[C]//Proceedings of the European Conference on Computer Vision (ECCV). 2018: 388-404.
Yu Z, Feng C, Liu M Y, et al. Casenet: Deep category-aware semantic edge detection[C]//Proceedings of the IEEE Conference on Computer Vision and Pattern Recognition. 2017: 5964-5973.
Supplementary European Search Report issued Dec. 6, 2022 in Application No. 20920101.1, pp. 1-9.
Cappelletti J D et al: "Three-Dimensional Boundary Following", Computer Vision Graphics and Image Processing, Academic Press, Duluth, MA, US, vol. 48, No. 1, Oct. 1989, pp. 80-92.
Liu Luyan et al: "Learning Crisp Edge Detector Using Logical Refinement Network", Sep. 29, 2020, arxiv.org, Cornell University Library, 201 Olin Library Cornell University Ithaca, NY 14853, pp. 332-341.

* cited by examiner

THREE-DIMENSIONAL EDGE DETECTION BASED ON MUTUAL OBJECT AND EDGE DETECTION AND THREE-DIMENSIONAL EDGE REFINEMENT DETECTION

RELATED APPLICATIONS

This application is a continuation of International Application No. PCT/CN2020/121120, filed on Oct. 15, 2020, which claims priority to Chinese Patent Application No. 202010104850.1, entitled "METHOD AND APPARATUS FOR THREE-DIMENSIONAL EDGE DETECTION, STORAGE MEDIUM, AND COMPUTER DEVICE", and filed on Feb. 20, 2020. The disclosures of the prior applications are hereby incorporated by reference in their entirety.

FIELD OF THE TECHNOLOGY

This disclosure relates to the field of computer technologies, including a method for three-dimensional edge detection, a storage medium, and a computer device.

BACKGROUND OF THE DISCLOSURE

With the development of computer technologies, image processing is becoming prevalent. Edge detection is a basic function in image processing and computer vision, which can provide important information for other computer vision tasks such as semantic segmentation, instance segmentation, and object tracking. However, most related edge detection methods are directed to edge detection of two-dimensional images, and there are few technologies to resolve the problem of edge detection of three-dimensional images. The accuracy of rare edge detection of three-dimensional images is also low, and no effective solution has been provided for this problem.

SUMMARY

According to embodiments provided in this disclosure, a method and apparatus for three-dimensional edge detection, a non-transitory computer-readable storage medium, and a computer device are provided.

In an embodiment, a method for three-dimensional edge detection includes obtaining, for each of plural two-dimensional slices of a three-dimensional image, a two-dimensional object detection result and a two-dimensional edge detection result, stacking the two-dimensional object detection results into a three-dimensional object detection result, and stacking the two-dimensional edge detection results into a three-dimensional edge detection result. The method also includes performing encoding according to a feature map of the three-dimensional image, the three-dimensional object detection result, and the three-dimensional edge detection result, to obtain an encoding result, and performing decoding according to the encoding result, the three-dimensional object detection result, and the three-dimensional edge detection result, to obtain an optimized three-dimensional edge detection result of the three-dimensional image.

In an embodiment, an apparatus for three-dimensional edge detection includes processing circuitry configured to obtain, for each of plural two-dimensional slices of a three-dimensional image, a two-dimensional object detection result and a two-dimensional edge detection result, stack the two-dimensional object detection results into a three-dimensional object detection result, and stack the two-dimensional edge detection results into a three-dimensional edge detection result. The processing circuitry is further configured to perform encoding according to a feature map of the three-dimensional image, the three-dimensional object detection result, and the three-dimensional edge detection result, to obtain an encoding result, and perform decoding according to the encoding result, the three-dimensional object detection result, and the three-dimensional edge detection result, to obtain an optimized three-dimensional edge detection result of the three-dimensional image.

In an embodiment, a non-transitory computer-readable storage medium stores computer-readable instructions thereon, which, when executed by one or more processors, cause the one or more processors to perform a method for three-dimensional edge detection. The method includes obtaining, for each of plural two-dimensional slices of a three-dimensional image, a two-dimensional object detection result and a two-dimensional edge detection result, stacking the two-dimensional object detection results into a three-dimensional object detection result, and stacking the two-dimensional edge detection results into a three-dimensional edge detection result. The method also includes performing encoding according to a feature map of the three-dimensional image, the three-dimensional object detection result, and the three-dimensional edge detection result, to obtain an encoding result, and performing decoding according to the encoding result, the three-dimensional object detection result, and the three-dimensional edge detection result, to obtain an optimized three-dimensional edge detection result of the three-dimensional image.

Details of one or more embodiments of this disclosure are provided in the subsequent accompanying drawings and descriptions. Other features, objectives, and advantages of this disclosure are illustrated in the specification, the accompanying drawings, and the claims.

BRIEF DESCRIPTION OF THE DRAWINGS

To describe technical solutions in embodiments of this disclosure, the following briefly introduces accompanying drawings describing the embodiments. The accompanying drawings in the following description show some embodiments of this disclosure, and a person of ordinary skill in the art may still derive other accompanying drawings according to the accompanying drawings.

DESCRIPTION OF EMBODIMENTS

Figure 1:
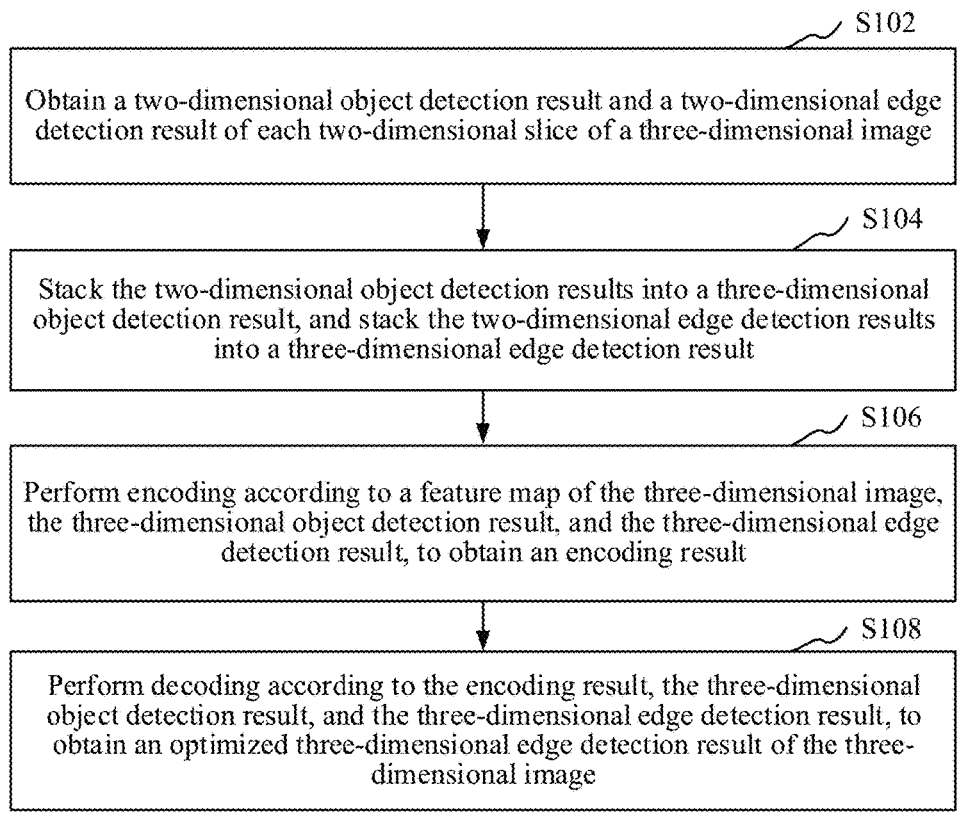
FIG. 1 is a flowchart diagram of a method for three-dimensional edge detection according to an embodiment.

To describe the objectives, technical solutions, and advantages of this disclosure, the disclosure further includes the accompanying drawings and embodiments. It is to be understood that the specific embodiments described herein are merely used for explaining this disclosure but are not intended to limit this disclosure.

Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

AI technology is a comprehensive discipline and relates to a wide range of fields including both a hardware-level technology and a software-level technology. Basic AI technologies generally include technologies such as sensors, dedicated AI chips, cloud computing, distributed storage, big data processing technology, operating/interaction systems, and electromechanical integration. AI software technologies mainly include several major directions such as a computer vision (CV) technology, a speech processing technology, a natural language processing technology, and machine learning (ML)/deep learning.

CV is a science that studies how to use a machine to "see", and furthermore, how to use a camera and a computer to replace human eyes to perform machine vision such as recognition, tracking, and measurement on a target, and further perform graphic processing, so that the computer modifies the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

ML is a multi-field inter-discipline and relates to a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, so as to keep improving performance of the computer. ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

With the research and progress of AI technology, AI technology is studied and applied in a plurality of fields, such as common smart home, smart wearable devices, virtual assistants, smart speakers, smart marketing, unmanned driving, automatic driving, unmanned aerial vehicles, robots, smart medical care, and smart customer service. It is believed that with the development of technologies, the AI technology will be applied in more fields, and play an increasingly important role.

The solutions provided in the embodiments of this disclosure involve technologies such as CV, ML, and deep learning of AI, and are specifically described by using the following embodiments.

The three-dimensional edge detection involved in the embodiments of this disclosure is the basis of image processing and CV, can provide important information for other CV such as semantic segmentation, object detection, instance segmentation or object tracking by performing three-dimensional edge detection on a three-dimensional image to obtain a three-dimensional edge detection result, and is a very basic and important CV task. In an actual application, the three-dimensional edge detection result may be helpful for a large number of medical image segmentation or detection tasks.

As shown in FIG. 1, in an embodiment, a method for three-dimensional edge detection is provided. In this embodiment, an example of performing the method by a computer device is mainly used for description. The computer device may be specifically a terminal or a server. Referring to FIG. 1, the method for three-dimensional edge detection specifically includes the following steps.

In step S102, a two-dimensional object detection result and a two-dimensional edge detection result are obtained for each two-dimensional slice of a three-dimensional image.

The three-dimensional image is an image that has information in three dimensions. The three-dimensional image is divided in one of the dimensions, and the two-dimensional slices of the three-dimensional image may be obtained. Generally, the three dimensions of the three-dimensional image may be considered as the three dimensions of height, width, and depth. The two-dimensional slice of the three-dimensional image is to divide the three-dimensional image in the depth dimension, and different two-dimensional slices correspond to different depth positions. In another embodiment, the three-dimensional image may alternatively be divided in other dimensions, which is not limited herein.

Specifically, the computer device may process each two-dimensional slice of the three-dimensional image by using a method of performing object detection on a two-dimensional image, to obtain the two-dimensional object detection result of each two-dimensional slice of the three-dimensional image; and process each two-dimensional slice of the three-dimensional image by using an algorithm of performing edge detection on the two-dimensional image, to obtain the two-dimensional edge detection result of each two-dimensional slice of the three-dimensional image. For a specific manner of performing object detection and a specific manner of performing edge detection, reference may be made to the detailed description of the subsequent embodiments.

An objective of object detection is to recognize a pixel region in which an object in the image is located, and an objective of edge detection is to recognize a pixel in the image that has a significant change in pixel grayscale. An edge usually exists between an object and a background. Both object detection and edge detection may be pixel-level detection, that is, a category to which each pixel belongs is determined according to a detection task. In this embodiment of this disclosure, object detection may be performed to detect an object without classifying the object, that is, distinguishing different objects, and it is not necessary to determine what the object is.

In step S104, the two-dimensional object detection results are stacked into a three-dimensional object detection result, and the two-dimensional edge detection results are stacked into a three-dimensional edge detection result.

Specifically, the three-dimensional image is divided in one of the dimensions into more than one two-dimensional slice. There is a specific order relationship between these two-dimensional slices, that is, each two-dimensional slice corresponds to a position (for example, a depth value) on the divided dimension. The two-dimensional object detection results of the two-dimensional slices are stacked according to an order relationship between corresponding two-dimensional slices, to obtain the three-dimensional object detection result; and the two-dimensional edge detection results of the two-dimensional slices are stacked according to the order relationship between the corresponding two-dimensional slices, to obtain the three-dimensional edge detection result.

In step S106, encoding is performed according to a feature map of the three-dimensional image, the three-dimensional object detection result, and the three-dimensional edge detection result, to obtain an encoding result.

The feature map is used for reflecting a feature of an image and is a form of expressing the feature of the image. The feature map is, for example, an original red, green, and blue (RGB) three-channel map of the image, or a Feature Map outputted by a convolution operation performed on the image.

When the image is encoded, a usual practice is to directly encode the feature map of the image. However, in this embodiment of this disclosure, encoding is performed according to three different types of data: the feature map, the three-dimensional object detection result, and the three-dimensional edge detection result. Further, a specific operation may alternatively be performed on the three types of data, and then encoding is performed on an operation result. In this way, during the encoding, more and more useful information may be obtained with reference to the three-dimensional object detection result and the three-dimensional edge detection result.

Specifically, the computer device may perform encoding according to the feature map of the three-dimensional image, the three-dimensional object detection result, and the three-dimensional edge detection result by using an encoder, to obtain the encoding result. Further, the computer device may perform a dot product operation on a color feature map of the three-dimensional image and the three-dimensional object detection result, add the result of the dot product operation with the three-dimensional edge detection result, and encode the operation result of the foregoing operation by using the encoder, to obtain the encoding result.

In an embodiment, S106 includes: performing more than one encoding operation according to the feature map of the three-dimensional image, the three-dimensional object detection result, and the three-dimensional edge detection result, an input of each encoding operation being an operation result of an operation performed on an output of a previous encoding operation by using the three-dimensional object detection result and the three-dimensional edge detection result (that is, an input of each encoding operation is based on an output of a previous encoding operation), and outputs of the encodings being different and being feature maps of the three-dimensional image; and obtaining a feature map outputted after a last encoding to obtain the encoding result.

Specifically, the computer device may perform encoding by using the encoder. The encoder may include more than one encoding stage, and the more than one encoding operation may be performed according to the feature map of the three-dimensional image, the three-dimensional object detection result, and the three-dimensional edge detection result. In this way, more than one level of encoding operation is performed on an input of the encoder, so that an obtained encoding result represents a more accurate feature. An input of each encoding stage of the encoder is an operation result of an operation performed on an output of a previous encoding stage by using the three-dimensional object detection result and the three-dimensional edge detection result. In this way, for each encoding stage, reference may be made to the three-dimensional object detection result and the three-dimensional edge detection result, which may improve the effectiveness of encoding. Each encoding stage of the encoder outputs the feature map of the three-dimensional image, and each encoding stage of the encoder outputs a different feature map. The computer device may use a feature map outputted in the last encoding stage as the encoding result.

Figure 2:
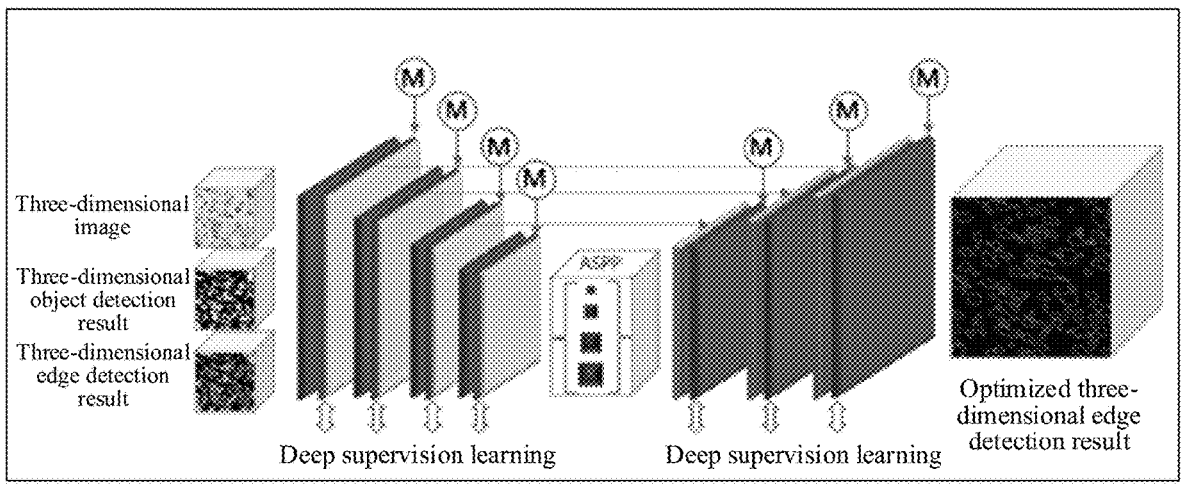
FIG. 2 is a schematic structural diagram of a three-dimensional edge refinement detection network according to an embodiment.

In a specific embodiment, the computer device may implement an encoding process through a three-dimensional edge refinement detection network (Joint Edge Refinement Network). Referring to FIG. 2, the three-dimensional edge refinement detection network includes an encoder. The encoder may include four encoding stages. Each encoding stage may include two convolutional modules, and each convolutional module may include a convolutional layer, an activation function layer, and a normalization layer. An activation function may be specifically a ReLU function, and normalization may be group normalization, and the like.

A model structure shown in FIG. 2 is merely for illustration and does not limit a structure of the three-dimensional edge refinement detection network. An actual three-dimensional edge refinement detection network may include more or fewer components than those shown in FIG. 2, and parameters of the structure included in FIG. 2 may also be different.

In an embodiment, the performing more than one encoding operation according to a feature map of the three-dimensional image, the three-dimensional object detection result, and the three-dimensional edge detection result includes: performing a first dot product operation on the color feature map of the three-dimensional image and the three-dimensional object detection result, adding the result of the first dot product operation with the three-dimensional edge detection result, and then performing a current encoding operation; and performing a second dot product operation on an output of the current encoding and the three-dimensional object detection result, adding the result of the second dot product operation with the three-dimensional edge detection result, and then performing a next encoding operation, until the last encoding operation.

It may be understood that object detection is to recognize a region in which an object in an image is located, and edge detection is to recognize a pixel in the image that has a significant change in pixel grayscale. Because an edge usually exists between an object and a background, it may be considered that there is a similarity between object detection and edge detection. Assuming that a result of object detection is $D_{obj}$, and a result of edge detection is $D_{edg}$, there is the following logic relationship between the two results:

$$D_{obj}=D_{obj} \cup D_{edg} \; D_{edg}=D_{obj} \cap D_{edg} \qquad (1)$$

Then there can be $F(g(I) \cdot D_{obj}+D_{edg})=D'_{edg}$, where $F(\bullet)$ and $g(\bullet)$ are different edge detection operators, I is an inputted image feature, and $D'_{edg}$ is a result of edge detection more accurate than $D_{edg}$. It may be generally understood that an intersection (that is, a dot product operation) of object detection and edge detection is edge detection, and a union (that is, an addition operation) of object detection and edge detection is object detection. An edge detection result is obtained through $g(I) \cdot D_{obj}+D_{edg}$. The edge detection operator is used again for the edge detection result, and a more accurate edge detection result can be obtained.

Specifically, the computer device may perform the first dot product operation on the color feature map of the three-dimensional image and the three-dimensional object detection result, add the result of the first dot product operation with the three-dimensional edge detection result, and use the result of the addition as an input of a first encoding stage; and subsequently, perform a second dot product operation on a feature map outputted from the encoding stage and the three-dimensional object detection result, add the result of the second dot product operation with the three-dimensional edge detection result, and use the result of the addition as an input of a next encoding stage, until the encoding result is outputted in the last encoding stage.

It may be understood that when a first encoding operation is performed according to the feature map of the three-dimensional image, the three-dimensional object detection result, and the three-dimensional edge detection result, no code is outputted, and the feature map of the three-dimensional image may be an original RGB color channel feature map of the three-dimensional image; and a feature map outputted in a previous encoding may be used during subsequent encoding.

Figure 3:
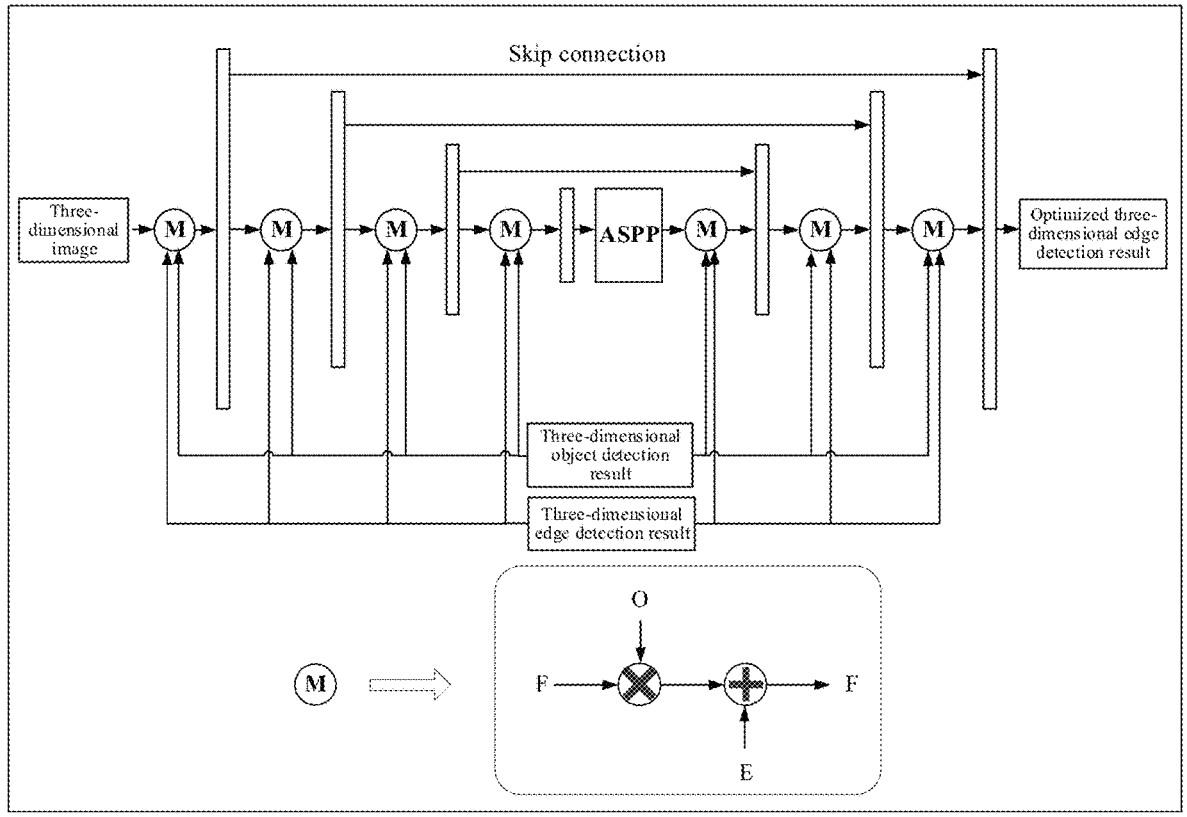
FIG. 3 is a schematic structural diagram of a three-dimensional edge refinement detection network according to another embodiment.

In a specific embodiment, referring to FIG. 3, the computer device may implement, by using a mutual learning module (M), the operation of performing the dot product operation on the color feature map of the three-dimensional image and the three-dimensional object detection result and then adding the result of the dot product operation with the three-dimensional edge detection result. That is, an input of the mutual learning module (M) is a feature map (F) of the three-dimensional image, a three-dimensional object detection result (O), and a three-dimensional edge detection result (E); and an output is a new feature map (F) of the three-dimensional image. Specifically, the mutual learning module (M) performs a dot product operation (⊗) on the feature map (F) of the three-dimensional image and the three-dimensional object detection result (O), and adds (⊕) the result of the dot product operation with the three-dimensional edge detection result (E), to output the new feature map (F) of the three-dimensional image. For a first mutual learning module (M), the feature map (F) of the three-dimensional image is a color feature map of the three-dimensional image, and for a subsequent mutual learning module (M), the feature map (F) of the three-dimensional image is a feature map outputted after encoding.

Still referring to FIG. 3, the computer device may input the color feature map of the three-dimensional image, the three-dimensional object detection result, and the three-dimensional edge detection result into the mutual learning module (M), and the mutual learning module (M) outputs the color feature map of the three-dimensional image, the three-dimensional object detection result, and the three-dimensional edge detection result to a first encoding stage of the encoder. An output encoded in the first encoding stage, the three-dimensional object detection result, and the three-dimensional edge detection result are jointly inputted into the mutual learning module (M), and the mutual learning module (M) outputs the output, the three-dimensional object detection result, and the three-dimensional edge detection result to a second encoding stage of the encoder. An output encoded in the second encoding stage, the three-dimensional object detection result, and the three-dimensional edge detection result are jointly inputted into the mutual learning module (M), and the mutual learning module (M) outputs the output, the three-dimensional object detection result, and the three-dimensional edge detection result to a third encoding stage of the encoder. An output encoded in the third encoding stage, the three-dimensional object detection result, and the three-dimensional edge detection result are jointly inputted into the mutual learning module (M), and the mutual learning module (M) outputs the output, the three-dimensional object detection result, and the three-dimensional edge detection result to a fourth encoding stage of the encoder. An output encoded in the fourth encoding stage is the encoding result. A model structure shown in FIG. 3 is merely for illustration, and does not limit a structure of the three-dimensional edge refinement detection network. An actual three-dimensional edge refinement detection network may include more or fewer components than those shown in FIG. 3, and parameters of the structure included in FIG. 3 may also be different.

It may be understood that because the mutual learning module (M) before the first encoding stage is not encoded, $g(I)$ in $g(I) \cdot D_{obj}+D_{edg}$ is an original color feature map of the image, code may be regarded as an edge detection operator, then an operation of the first encoding stage may be regarded as an operation of performing $F(g(I) \cdot D_{obj}+D_{edg})$. Because the mutual learning modules (M) before the subsequent encoding stages are encoded, I in $g(I) \cdot D_{obj}+D_{edg}$ is an image feature inputted into the previous encoding stage, code may be regarded as an edge detection operator, and $g(I)$ is an image feature outputted in the previous encoding stage.

In this embodiment, during each encoding, a dot product operation is performed on the feature map of the three-dimensional image and the three-dimensional object detection result, and encoding is performed after the result of the dot product operation is added with the three-dimensional edge detection result, so that a region in which an object of interest is located is focused on during the encoding. In addition, an existing potential edge detection result is also enhanced in an input feature map, so that an encoding output can more accurately represent the feature.

In the foregoing embodiment, more than one encoding operation, that is, more than one level of encoding is performed on data, and the obtained encoding output can more accurately represent the feature.

In step S108, decoding is performed according to the encoding result, the three-dimensional object detection result, and the three-dimensional edge detection result, to obtain an optimized three-dimensional edge detection result of the three-dimensional image.

The three-dimensional edge detection result obtained by stacking the two-dimensional edge detection results in S104 is a relatively accurate detection result. The optimized three-dimensional edge detection result is more accurate than the three-dimensional edge detection result obtained by stacking the two-dimensional edge detection results, and is closer to a real edge of the object. The optimized three-dimensional edge detection result is not limited to a result obtained by optimizing, by using an optimization algorithm, the three-dimensional edge detection result obtained by stacking the two-dimensional edge detection results, and may also be a three-dimensional edge detection result obtained by applying the three-dimensional edge detection result obtained by stacking the two-dimensional edge detection results to a specific process of performing edge detection on the three-dimensional image.

In addition, when the encoding result is decoded, a usual practice is to directly decode the encoding result. However, in this embodiment of this disclosure, decoding is performed according to the three different types of data: the encoding result, the three-dimensional object detection result, and the three-dimensional edge detection result. Further, a specific operation may alternatively be performed on the three types of data, and decoding is performed on an operation result. In this way, during the decoding, more and more useful information may be obtained with reference to the three-dimensional object detection result and the three-dimensional edge detection result.

Specifically, the computer device may perform decoding according to the encoding result, the three-dimensional object detection result, and the three-dimensional edge detection result by using a decoder to obtain a decoding result, that is, obtain the optimized three-dimensional edge detection result of the three-dimensional image. Further, the computer device may perform a dot product operation on the encoding result and the three-dimensional object detection result, add the result of the dot product operation with the three-dimensional edge detection result, and decode the addition result of the foregoing operation by using the decoder, to obtain the decoding result, that is, obtain the optimized three-dimensional edge detection result of the three-dimensional image.

In a specific embodiment, the optimized three-dimensional edge detection result of the three-dimensional image may be a three-dimensional image including two possible pixel values. One pixel value indicates that a corresponding pixel is a pixel on an edge, and the other pixel value indicates that a corresponding pixel is a pixel not on an edge.

In a specific embodiment, the optimized three-dimensional edge detection result of the three-dimensional image may be a three-dimensional probability matrix. A probability value of each matrix position represents a probability that a corresponding pixel of the three-dimensional image belongs to pixels on an edge. When the probability is greater than a preset threshold, the corresponding pixel is considered to be the pixel on the edge.

In an embodiment, S108 includes: performing more than one decoding operation according to the encoding result, the three-dimensional object detection result, and the three-dimensional edge detection result, an input of each decoding operation including an operation result of an operation performed on an output of a previous decoding operation by using the three-dimensional object detection result and the three-dimensional edge detection result (that is, an input of each decoding operation is based on an output of a previous decoding operation); and obtaining an output of a last decoding operation, to obtain the optimized three-dimensional edge detection result of the three-dimensional image.

Specifically, the computer device may perform decoding by using the decoder. The decoder may include more than one decoding stage, and the more than one decoding operation may be performed according to the encoding result, the three-dimensional object detection result, and the three-dimensional edge detection result. Because a multi-level decoding operation is performed on an input of the decoder, a feature extracted through encoding may be accurately mapped to an output space. An input of each decoding stage of the decoder includes an operation result of an operation performed on an output of a previous decoding stage by using the three-dimensional object detection result and the three-dimensional edge detection result. In this way, for each decoding stage, reference may be made to the three-dimensional object detection result and the three-dimensional edge detection result for decoding, to improve the effectiveness of decoding. Each decoding stage of the decoder outputs the feature map of the three-dimensional image, and each decoding stage of the decoder outputs a different feature map. The output space may be: whether it is a detection result of a three-dimensional boundary.

It may be understood that a feature map outputted in a last decoding stage may be the optimized three-dimensional edge detection result of the three-dimensional image. The optimized three-dimensional edge detection result may be specifically a classification map of each pixel of the three-dimensional image. A pixel value of the pixel on the classification map represents a category to which a corresponding pixel of the three-dimensional image belongs. There are two categories herein, one is a category that a pixel belongs to an edge, and the other is a category that a pixel does not belong to the edge. For example, the pixel values of the pixels on the classification map include 0 and 1.0 represents that a corresponding pixel of the three-dimensional image is not an edge pixel, and 1 indicates that a corresponding pixel of the three-dimensional image is an edge pixel. That is, two processes of encoding and decoding the three-dimensional image are a process of performing three-dimensional edge detection on the three-dimensional image, to determine whether each pixel in the three-dimensional image is a pixel of a three-dimensional edge.

In another embodiment, the optimized three-dimensional edge detection result may be specifically a probability distribution map of each pixel of the three-dimensional image being an edge pixel. A pixel value of the pixel on the probability distribution map represents a probability that a corresponding pixel point of the three-dimensional image is an edge pixel point.

In a specific embodiment, still referring to FIG. 2, the three-dimensional edge refinement detection network may include a decoder. The decoder may include three decoding stages. Each decoding stage may include two convolutional modules, and each convolutional module may include a convolutional layer, an activation function layer, and a normalization layer. An activation function may be specifically a ReLU function, and normalization may be group normalization, and the like.

In another embodiment, an input of each decoding operation may further include an output of an encoding stage that is in a skip connection with a current decoding stage. In this way, an image feature extracted in the previous encoding operation may also be combined during decoding, thereby further improving the decoding accuracy. For example, assuming that the encoder includes four stages, and the decoder includes three stages, a first encoding stage may be in a skip connection with a third decoding stage, a second encoding stage may be in a skip connection with a second decoding stage, and a third encoding stage may be in a skip connection with a first decoding stage.

In another embodiment, more than one decoding operation, that is, more than one level of decoding is performed on data, so that a classification result of the pixel is more accurate by using an obtained decoding output.

In an embodiment, the performing more than one decoding operation according to the encoding result, the three-dimensional object detection result, and the three-dimensional edge detection result includes: performing a first dot product operation on the encoding result and the three-dimensional object detection result, adding the result of the first dot product operation with the three-dimensional edge detection result, and then performing a current decoding operation; and performing a second dot product operation on an output of the current decoding operation and the three-dimensional object detection result, adding the result of the second dot product operation with the three-dimensional edge detection result, and then performing a next decoding operation, until the last decoding.

Specifically, the computer device may perform the first dot product operation on the encoding result and the three-dimensional object detection result, add the result of the first dot product operation with the three-dimensional edge detection result, and use the addition result as an input of a first decoding stage; and subsequently, perform a second dot product operation on a feature map outputted from the decoding stage and the three-dimensional object detection result, add the result of the second dot product operation with the three-dimensional edge detection result, and use the addition result as an input of a next decoding stage, until the optimized three-dimensional edge detection result of the three-dimensional image is outputted in the last decoding stage.

In another embodiment, the computer device may perform a first dot product operation on the encoding result and the three-dimensional object detection result, add the result of the first dot product operation with the three-dimensional edge detection result, and jointly use the addition result and an output of an encoding stage that is in a skip connection with a first decoding stage as an input of the first decoding stage; and subsequently, perform a second dot product operation on a feature map outputted from the decoding stage and the three-dimensional object detection result, add the result of the second dot product operation with the three-dimensional edge detection result, and jointly use the addition result and an output of an encoding stage that is in a skip connection with a current decoding stage as an input of a next decoding stage, until the optimized three-dimensional edge detection result of the three-dimensional image is outputted in the last decoding stage.

In the foregoing embodiments, during each decoding operation, a dot product operation is performed on the feature map of the three-dimensional image and the three-dimensional object detection result, and decoding is performed after the result of the dot product operation is added with the three-dimensional edge detection result, so that a region in which an object of interest is located is focused on during the decoding. In addition, an existing potential edge detection result is also enhanced in an input feature map, thereby improving the decoding accuracy.

In an embodiment, the method for three-dimensional edge detection further includes: processing the encoding result by using plural atrous convolutions with different sampling rates to obtain plural feature maps, the plural feature maps being of different sizes; and performing a convolution operation after the more than one feature map is connected, to obtain a multi-scale learning result. The performing more than one decoding operation according to the encoding result, the three-dimensional object detection result, and the three-dimensional edge detection result includes: performing more than one decoding operation according to the multi-scale learning result, the three-dimensional object detection result, and the three-dimensional edge detection result.

The atrous convolution is also referred to as a dilated convolution, which introduces a parameter referred to as "dilation rate" into a standard convolutional layer. The parameter defines a spacing between values when a convolution kernel processes data. An objective of the atrous convolution is to provide a larger receptive field without pooling (a pooling layer causes information loss) and with an equivalent calculation amount.

Specifically, the computer device may process the encoding result by using plural atrous convolutions with different sampling rates to obtain plural feature maps. Because different sampling rates may be different convolution kernel sizes and/or different dilation rates, the obtained more than one feature maps have different sizes. The computer device performs the convolution operation after connecting the more than one feature map to obtain the multi-scale learning result. The multi-scale learning result may also be a feature map of the three-dimensional image.

In a specific embodiment, the computer device may implement the operation of processing the encoding result by using plural atrous convolutions with different sampling rates to obtain plural feature maps, the plural feature maps being of different sizes; and performing a convolution operation after the more than one feature map is connected, to obtain a multi-scale learning result by using a multi-scale learning module. The multi-scale learning module may be an atrous spatial pyramid pooling (ASPP) structure. Still referring to FIG. 2, the three-dimensional edge refinement detection network further includes an ASPP module between the encoder and the decoder. An input of the ASPP module is the encoding result outputted in the fourth encoding stage. After performing feature extraction of more than one scale on the input, the ASPP module outputs the multi-scale learning result.

In the foregoing embodiment, the encoding result is operated through multi-scale atrous convolution, so that more abundant multi-scale and multi-viewing-angle image features may be extracted, which is helpful for subsequent decoding operations.

In an embodiment, the performing more than one decoding operation according to the multi-scale learning result, the three-dimensional object detection result, and the three-dimensional edge detection result includes: performing a first dot product operation on the multi-scale learning result and the three-dimensional object detection result, adding the result of the first dot product operation with the three-dimensional edge detection result, and then performing a current decoding operation; and performing a second dot product operation on an output of the current decoding operation and the three-dimensional object detection result, adding the result of the second dot product operation with the three-dimensional edge detection result, and then performing a next decoding operation, until the last decoding.

In an embodiment, the performing more than one decoding operation according to the multi-scale learning result, the three-dimensional object detection result, and the three-dimensional edge detection result includes: performing a first dot product operation on the multi-scale learning result and the three-dimensional object detection result, adding the result of the first dot product operation with the three-dimensional edge detection result, and then performing a current decoding operation to output an intermediate encoding; and performing a second dot product operation on an output of the current decoding operation and the three-dimensional object detection result, adding the result of the second dot product operation with the three-dimensional edge detection result, and then performing a next encoding operation with an output of a an encoding operation prior to the intermediate encoding until the last decoding.

Specifically, the computer device may perform a first dot product operation on the multi-scale learning result and the three-dimensional object detection result, add the result of the first dot product operation with the three-dimensional edge detection result, and jointly use the addition result and an output of an encoding stage that is in a skip connection with a first decoding stage as an input of the first decoding stage; and subsequently, perform a second dot product operation on a feature map outputted from the decoding stage and the three-dimensional object detection result, add the result of the second dot product operation with the three-dimensional edge detection result, and jointly use the addition result and an output of an encoding stage that is in a skip connection with a current decoding stage as an input of a next decoding stage, until the optimized three-dimensional edge detection result of the three-dimensional image is outputted in the last decoding stage.

Still referring to FIG. 3, the computer device may input the multi-scale learning result, the three-dimensional object detection result, the three-dimensional edge detection result into the mutual learning module (M), and jointly input an output of the mutual learning module (M) and an output of the third encoding stage into a first decoding stage of the decoder; jointly input an output obtained through decoding in the first decoding stage, the three-dimensional object detection result, and the three-dimensional edge detection result into the mutual learning module (M), and jointly input the output of the mutual learning module (M) and an output of the second encoding stage into a second decoding stage of the decoder; and jointly input an output obtained through decoding in the second decoding stage, the three-dimensional object detection result, and the three-dimensional edge detection result into the mutual learning module (M), and jointly input the output of the mutual learning module (M) and an output of the first encoding stage into a third decoding stage of the decoder; and an output obtained through decoding in the third decoding stage is an optimized three-dimensional edge (subtle 3D edge) detection result of the three-dimensional image.

In the foregoing embodiment, during a decoding operation, feature maps outputted in the encoding stages that are in a skip connection are jointly decoded, so that an input obtained through a subsequent decoding not only clarifies an image feature, but also combines the image feature extracted through the previous encoding, thereby further improving the decoding accuracy.

In this way, after the feature map of the three-dimensional image is encoded and decoded based on a three-dimensional detection result obtained by stacking two-dimensional detection results, the optimized three-dimensional edge detection result may be obtained, and a subtle 3D edge is obtained. The subtle 3D edge may provide more and richer features and auxiliary results from other perspectives for various medical image tasks such as segmentation, detection or tracking, and help achieve more accurate medical image-assisted diagnosis.

In the foregoing method for three-dimensional edge detection, after the two-dimensional object detection result and the two-dimensional edge detection result of each two-dimensional slice of the three-dimensional image are obtained, the three-dimensional object detection result and the three-dimensional edge detection result are stacked, encoding is performed according to the feature map of the three-dimensional image, the three-dimensional object detection result and the three-dimensional edge detection result, and decoding is performed with reference to the three-dimensional object detection result and the three-dimensional edge detection result, to obtain the optimized three-dimensional edge detection result of the three-dimensional image. In this way, when three-dimensional edge detection is performed on the three-dimensional image, the two-dimensional detection result of each two-dimensional slice of the three-dimensional image is used in the three-dimensional edge detection, so that a feature of the two-dimensional detection result and a spatial structure of three-dimensional data are complemented with each other skillfully and continuously. In addition, the two-dimensional detection result includes two detection results: object detection and edge detection. The two detection results can also learn from each other and promote each other, thereby further improving the accuracy of three-dimensional edge detection.

In an embodiment, steps S106 and S108 in the foregoing embodiment may be implemented through a three-dimensional edge refinement detection network (Joint Edge Refinement Network). The three-dimensional edge refinement detection network may include an encoder and a decoder. The encoder may include a plurality of encoding stages, and the decoder may include a plurality of decoding stages.

An input of a first encoding stage may be an operation result of an operation on a color feature map of a three-dimensional image, a three-dimensional object detection result, and a three-dimensional edge detection result, and an input of a non-first encoding stage may be an operation result of an operation on an output of a previous encoding stage, the three-dimensional object detection result, and the three-dimensional edge detection result. An input of a first decoding stage may include an operation result of an operation on an encoding result, the three-dimensional object detection result, and the three-dimensional edge detection result, and an input of non-first decoding stage may include an operation result of an operation on an output of a previous decoding stage, the three-dimensional object detection result, and the three-dimensional edge detection result.

In another embodiment, the operation results of the three types of data included in the inputs of the encoding (decoding) stage may be operated by using a mutual learning module.

In another embodiment, an input of each decoding stage may further include an output of an encoding stage that is in a skip connection with a current decoding stage.

In another embodiment, the three-dimensional edge refinement detection network may further include a multi-scale learning module (such as an ASPP module) between the encoder and the decoder. An input of the multi-scale learning module is an output of a last encoding stage. In this case, the input of the first decoding stage may be an operation result of an operation on an output of the multi-scale learning module, the three-dimensional object detection result, and the three-dimensional edge detection result.

The foregoing embodiments only show several implementations of the three-dimensional edge refinement detection network of this disclosure and are described in detail, but they are not to be construed as a limit to the three-dimensional edge refinement detection network of this disclosure. A person of ordinary skill in the art may further make variations and improvements without departing from the ideas of the three-dimensional edge refinement detection network of this disclosure, which all fall within the protection scope of the three-dimensional edge refinement detection network of this disclosure.

The three-dimensional edge refinement detection network provided in the foregoing embodiments may be obtained by performing deep supervision learning on training samples with training labels. Still referring to FIG. 2, structures included in the network may be obtained through deep supervision learning.

Specifically, training samples inputted into the three-dimensional edge refinement detection network are a three-dimensional image sample, a three-dimensional object detection result obtained by stacking two-dimensional object detection results of two-dimensional slices of the three-dimensional image sample, and a three-dimensional edge detection result obtained by stacking two-dimensional edge detection results of the two-dimensional slices of the three-dimensional image sample. A training label of the training sample is a three-dimensional edge label of the three-dimensional image sample. A computer device may train the three-dimensional edge refinement detection network under supervision according to the training sample and training label and by constructing a loss function.

In a specific embodiment, the loss function trained under supervision may be a Dice loss function, and this loss function is specifically shown in the following formula:

$$DL(y, p) = 1 - \frac{2\sum_{i}^{N} y_i p_i}{\sum_{i}^{N} y_i + \sum_{i}^{N} p_i} \quad (2)$$

where N is the number of pixels in a three-dimensional image, $p_i$ is a probability that an $i^{th}$ pixel is an edge pixel, and $y_i$ is a training label of the $i^{th}$ pixel.

In an embodiment, the obtaining a two-dimensional object detection result and a two-dimensional edge detection result of each two-dimensional slice of a three-dimensional image includes: obtaining a two-dimensional initial object detection result and a two-dimensional initial edge detection result of each two-dimensional slice of the three-dimensional image; performing, for each two-dimensional slice of the three-dimensional image, a dot product operation on a color feature map of the two-dimensional slice and the two-dimensional initial edge detection result of the two-dimensional slice, and adding the result of the dot product operation with the two-dimensional initial object detection result of the two-dimensional slice to perform object detection to obtain a two-dimensional object detection result of the two-dimensional slice; and performing a convolution operation on each two-dimensional slice of the three-dimensional image, and obtaining a two-dimensional edge detection result of each two-dimensional slice according to an output of the convolution operation and a two-dimensional object detection result of a corresponding two-dimensional slice.

The computer device may perform object detection and edge detection independently by using different networks. For example, an object detection model is used for object detection, and an edge detection model is used for edge detection. However, there are many features in object detection and edge detection that can learn from each other, influence each other, and promote each other. Therefore, the features extracted from object detection and edge detection can be transferred to each other in a process of network training and network use.

With reference to the formula (1) described in the foregoing embodiment and the description of related logic principles, the computer device may implement, by using a mutual learning module, the mutual transfer of the features extracted in object detection and edge detection. The mutual learning module may specifically perform the following operation $g(I) \cdot D_{obj} + D_{edg}$, that is, a dot product operation is performed on an image feature and an object detection result, and then the result of the dot product operation is added with an edge detection result.

Specifically, the computer device may respectively pre-train the object detection model and the edge detection model under supervision. After pre-training, the two models are connected by using the mutual learning module, to obtain a mutual object and edge detection network, which is then further trained. For example, referring to FIG. 4, in the mutual object and edge detection network, the mutual learning module may be added before the object detection model and/or the mutual learning module may be added after the edge detection model.

The object detection model and the edge detection model obtained through pre-training are used to obtain an initial two-dimensional detection result (a two-dimensional initial object detection result and a two-dimensional initial edge detection result) of a two-dimensional image according to the two-dimensional image. The mutual object and edge detection network obtained through further training is used to obtain a two-dimensional detection result of the two-dimensional image according to the two-dimensional image. The two-dimensional detection result is used to be stacked into a three-dimensional detection result, to be used in steps such as S106 and S108.

In this way, the computer device may input each two-dimensional slice of the three-dimensional image into the object detection model obtained through pre-training, to obtain a two-dimensional initial object detection result of each two-dimensional slice; and input each two-dimensional slice of the three-dimensional image into the edge detection model obtained through pre-training, to obtain a two-dimensional initial edge detection result of each two-dimensional slice. Subsequently, the computer device then inputs each two-dimensional slice of the three-dimensional image into the mutual object and edge detection network. The mutual learning module before the object detection model in the mutual object and edge detection network performs a dot product operation on the color feature map of the two-dimensional slice and the two-dimensional initial edge detection result of the two-dimensional slice, adds the result of the dot product operation with the two-dimensional initial object detection result of the two-dimensional slice, and inputs the result of the addition into the object detection model of the mutual object and edge detection network, to output the two-dimensional object detection result of the two-dimensional slice. The edge detection model in the mutual object and edge detection network performs a convolution operation on the two-dimensional slice. The mutual learning module after the edge detection model in the mutual object and edge detection network performs a dot product operation on an output of the convolution operation and the two-dimensional object detection result and adds the result of the dot product operation with the output of the convolution operation, to obtain the two-dimensional edge detection result of the two-dimensional slice.

In the foregoing embodiment, the object detection and the edge detection learn and promote each other, so that the obtained two-dimensional detection result is more accurate, and reference data in subsequent three-dimensional detection may be more accurate.

In an embodiment, the performing, for each two-dimensional slice of the three-dimensional image, a dot product operation on a color feature map of the two-dimensional slice and the two-dimensional initial object detection result of the two-dimensional slice, and adding the result of the dot product operation with the two-dimensional initial object detection result of the two-dimensional slice to perform object detection, to obtain a two-dimensional object detection result of the two-dimensional slice includes: respectively performing the following operations on each two-dimensional slice of the three-dimensional image: performing a dot product operation on the color feature map of the two-dimensional slice and the two-dimensional initial object detection result of the two-dimensional slice, and adding the result of the dot product operation with the two-dimensional initial object detection result of the two-dimensional slice to generate to-be-processed data; and performing more than one encoding operation and more than one decoding operation on the to-be-processed data, to obtain the two-dimensional object detection result of the two-dimensional slice outputted after a last decoding operation.

Specifically, the computer device may perform encoding by using an encoder and decoding by using a decoder. The encoder may include a plurality of encoding stages; and the decoder may include a plurality of decoding stages. In this way, the computer device may perform a dot product operation on the color feature map of the two-dimensional slice and the two-dimensional initial object detection result of the two-dimensional slice and add the result of the dot product operation with the two-dimensional initial object detection result of the two-dimensional slice to generate to-be-processed data. The to-be-processed data is used as an input of a first encoding stage; and a feature map outputted in this encoding stage is used as an input of a next encoding stage, until an encoding result is outputted in a last encoding stage. Subsequently, the encoding result is used as an input of a first decoding stage; and a feature map outputted in this decoding stage is used as an input of a next decoding stage, until the two-dimensional object detection result is outputted in a last decoding stage.

The encoder in this embodiment and the encoder in S106 are different encoders and have different structures, and dimensions of data encoded by the encoders are also different. The decoder in this embodiment and the decoder in S108 are different decoders and have different structures, and dimensions of data decoded by the decoders are also different.

In another embodiment, an encoding stage may further be in a skip connection with a decoding stage. In this case, inputs of a first decoding stage of the decoder may be an output of a last encoding stage and an output of an encoding stage that is in a skip connection, and inputs of a subsequent decoding stage may be an output of a previous decoding stage and an output of an encoding stage that is in a skip connection.

In the foregoing embodiment, when being encoded, a two-dimensional image is used as an encoding object after an operation is performed on the two-dimensional image and an initial detection result, and a specific region may be focused on with reference to the initial detection result during the encoding, to extract more useful information. In addition, a feature may be represented more accurate by performing more than one encoding operation, and by performing more than one decoding operation, a classification result of a pixel obtained by a decoding output may be more accurate.

In an embodiment, the performing more than one encoding operation and more than one decoding operation on the to-be-processed data, to obtain the two-dimensional object detection result of the two-dimensional slice outputted after a last decoding includes: performing more than one encoding operation on the to-be-processed data, to obtain an object detection encoding result outputted after the last encoding; processing the object detection encoding result by using plural atrous convolutions with different sampling rates to obtain plural feature maps, the plural feature maps being of different sizes; and performing a convolution operation after the plural feature maps are connected, to obtain a multi-scale learning result; and performing more than one decoding operation on the multi-scale learning result, to obtain the two-dimensional object detection result of the two-dimensional slice outputted after the last decoding operation.

Specifically, the computer device may perform encoding by using an encoder and decoding by using a decoder. The encoder may include a plurality of encoding stages; and the decoder may include a plurality of decoding stages. In this way, the computer device may perform a dot product operation on the color feature map of the two-dimensional slice and the two-dimensional initial object detection result of the two-dimensional slice and add the result of the dot product operation with the two-dimensional initial object detection result of the two-dimensional slice to generate to-be-processed data. The to-be-processed data is used as an input of a first encoding stage; and a feature map outputted in this encoding stage is used as an input of a next encoding stage, until an encoding result is outputted in a last encoding stage.

Subsequently, the object detection encoding result is processed by using plural atrous convolutions with different sampling rates to obtain plural feature maps, the plural feature maps being of different sizes; and a convolution operation is performed after the plural feature maps are connected, to obtain the multi-scale learning result. This process may be implemented by using a multi-scale learning module. A structure of the multi-scale learning module is specifically as a structure of the ASPP module.

Subsequently, the multi-scale learning result is then used as an input of a first decoding stage; and a feature map outputted in this decoding stage is used as an input of a next decoding stage, until the two-dimensional object detection result is outputted in a last decoding stage. In another embodiment, an encoding stage may further be in a skip connection with a decoding stage. In this case, inputs of a first decoding stage of the decoder may be an output of the multi-scale learning module and an output of an encoding stage that is in a skip connection, and inputs of a subsequent decoding stage may be an output of a previous decoding stage and an output of an encoding stage that is in a skip connection.

In the foregoing embodiment, the encoding result is operated through multi-scale atrous convolution, so that more abundant multi-scale and multi-viewing-angle image features may be extracted, which is helpful for subsequent decoding operations.

Figure 5:
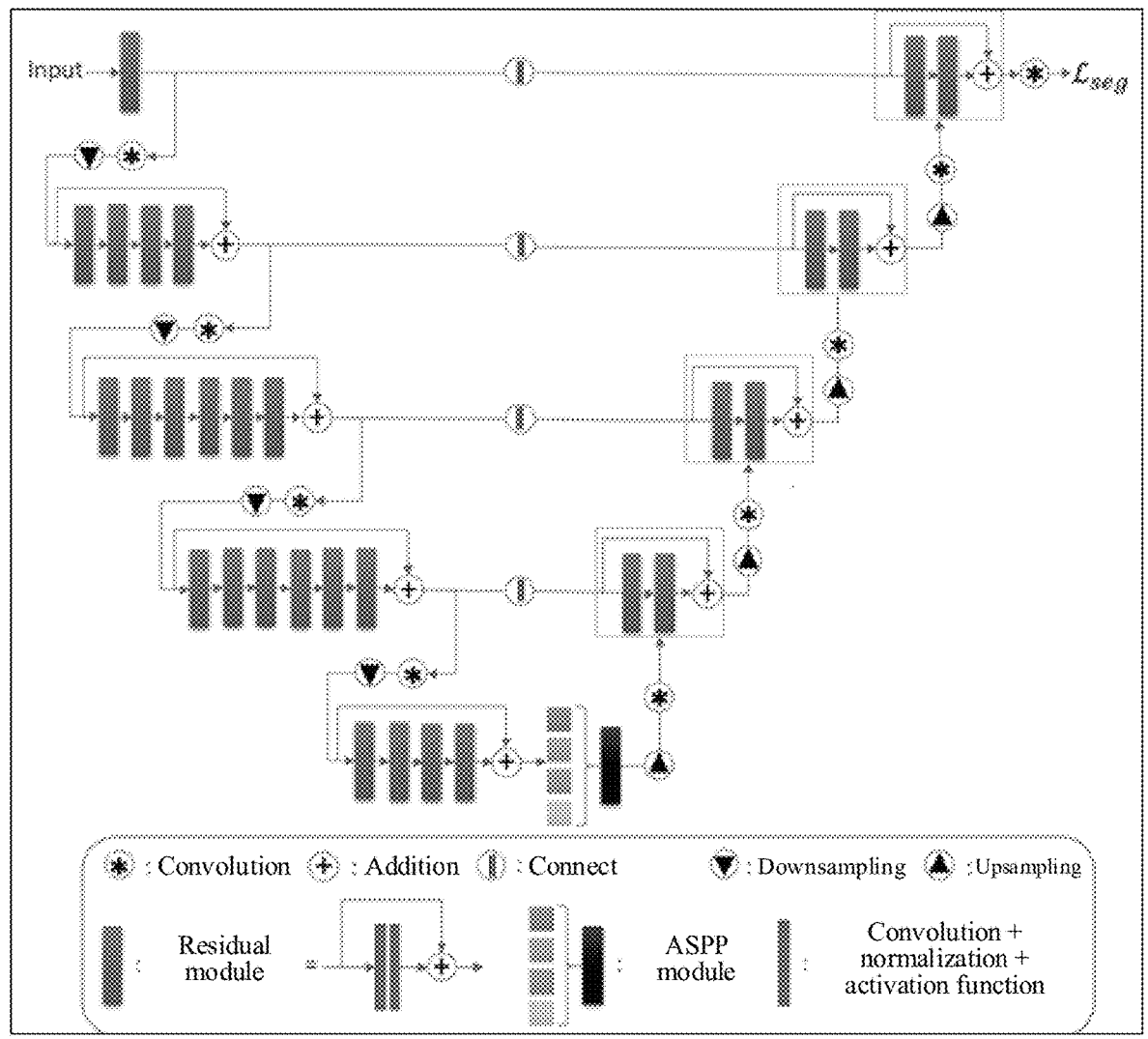
FIG. 5 is a schematic structural diagram of an object detection model according to an embodiment.

In a specific embodiment, referring to FIG. 5, an input of an object detection model is a two-dimensional slice of a three-dimensional image, and an output is an object detection result of the two-dimensional slice. The object detection model includes an encoder, a decoder, and an ASPP module between the encoder and the decoder. The encoder includes an input layer and four encoding stages. The input layer includes residual modules, and the four encoding stages respectively include four, six, six, and four residual modules. An input and an output of each encoding stage are connected by an addition operation, and each encoding stage is followed by a convolution operation (a kernel size such as 3×3) and an average pooling operation (a kernel size such as 2×2), to downsample a feature map (for example, downsample the feature map to a half size). The decoder includes four decoding stages and an output convolutional layer. Each decoding stage includes two residual modules, and there is an upsampling (for example, upsampling by two times) and convolution operation (a kernel size such as 1×1) performed before each decoding stage. The encoding stage and the decoding stage may be in a skip connection, and the input layer and an output layer may also be in a skip connection. Each residual module includes two convolutional modules, and each convolutional module includes a convolutional layer, a normalization layer, and an activation function layer. Normalization may be batch normalization. An activation function may be a ReLU function. When the object detection model is trained, the loss function may be denoted as $L_{seg}$ for supervised training.

A model structure shown in FIG. 5 is merely for illustration, and does not limit a structure of the object detection model. An actual object detection model may include more or fewer components than those shown in FIG. 5, and parameters of the structure included in FIG. 5 may also be different.

Specifically, a computer device may train the object detection model under supervision according to a training sample (a two-dimensional image) and a training label (an object detection label) of the training sample and by constructing a loss function.

In a specific embodiment, the loss function trained under supervision may be a binary classification category cross-entropy loss function, and this loss function is specifically shown in the following formula:

$$CE(p, y) = \begin{cases} -\log(p) & \text{if } y = 1 \\ -\log(1 - p) & \text{otherwise} \end{cases} \quad (3)$$

where y is a pixel-level label of an image, and p is a probability value that a pixel with a label of 1 predicted by a model belongs to a category. The label of 1 may specifically indicate that the pixel is a pixel of an object.

In an embodiment, the performing a convolution operation on each two-dimensional slice of the three-dimensional image, and obtaining a two-dimensional edge detection result of each two-dimensional slice according to an output of the convolution operation and a two-dimensional object detection result of a corresponding two-dimensional slice includes: respectively performing the following operations on each two-dimensional slice of the three-dimensional image: performing a convolution operation of more than one stage on the two-dimensional slice; performing a dot product operation on an output of each stage and the two-dimensional initial object detection result of the two-dimensional slice, and adding the result of the dot product operation with an output of a current stage to obtain a stage detection result; and combining the stage detection results to obtain the two-dimensional edge detection result of the two-dimensional slice.

Specifically, the computer device may perform the convolution operation of more than one stage on the two-dimensional slice, perform the dot product operation on the output of each stage and the two-dimensional initial object detection result of the two-dimensional slice, and add the result of the dot product operation with the output of the current stage to obtain the stage detection result; and combine the stage detection results to obtain the two-dimensional edge detection result of the two-dimensional slice.

Each stage includes more than one convolutional layer. Each stage detection result may also be used as the two-dimensional edge detection result of the two-dimensional slice. Combining the stage detection results may be performing element-wise addition on the stage detection results.

In another embodiment, the output of each stage may be a result obtained by performing element-wise addition on an output of each convolutional layer included in this stage. Element-wise addition may be performed on the output of each convolutional layer after a convolution operation is performed. Before the dot product operation is performed on the output of each convolutional layer and the two-dimensional initial object detection result of the two-dimensional slice, a downsampling operation, a convolution operation, and an upsampling operation may be performed.

In the foregoing embodiments, a convolution operation of more than one stage is performed on data, an operation is performed on the output of the convolution operation and the object detection result at each stage, an edge detection result of this stage is obtained, and the accuracy of edge detection may be improved with reference to the object detection result. In addition, the stage detection results are combined to obtain the two-dimensional edge detection result of the two-dimensional slice, and information extracted at each stage may be integrated to improve the accuracy of edge detection.

Figure 6:
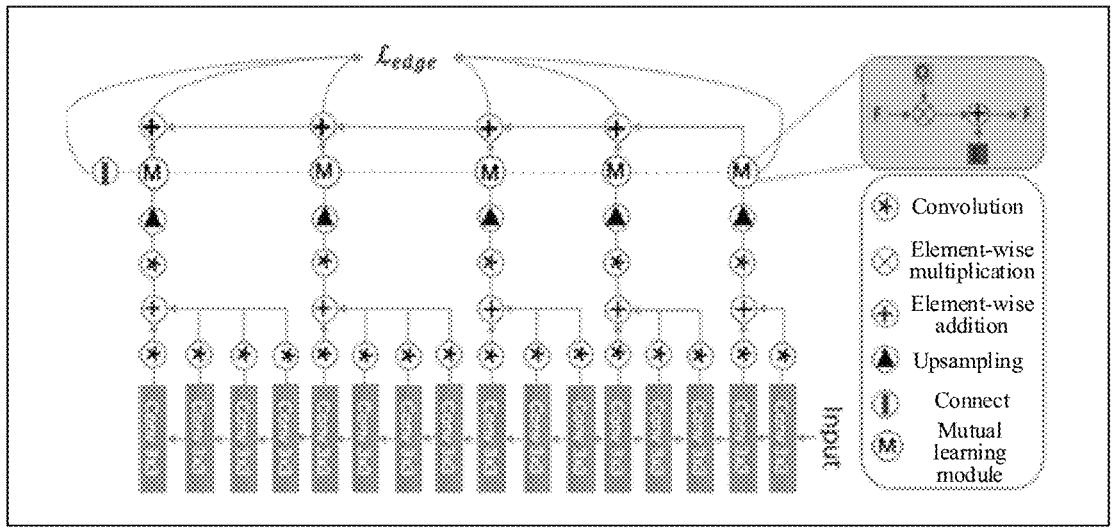
FIG. 6 is a schematic structural diagram of an edge detection model according to an embodiment.

In a specific embodiment, an input of an edge detection model is a two-dimensional slice of the three-dimensional image, and an output is an edge detection result of the two-dimensional slice. The edge detection model includes more than one convolutional layer, and the convolutional layers are divided into more than one stage. For example, referring to FIG. 6, the edge detection model includes 16 convolutional layers with a kernel size of 3×3. These convolutional layers are divided into five stages. A first stage includes two convolutional layers, a second stage and a third stage include three convolutional layers, and a fourth stage and a fifth stage include four convolutional layers. Each convolutional layer in each stage is added up after concatenating a convolution operation with a kernel size of 1×1 to obtain a feature map of each stage. After being subject to the convolution operation with the kernel size of 1×1 and upsampling by two times, the feature map is inputted to the mutual learning module M mentioned above together with the object detection result, and the obtained five outputs are connected to obtain the edge detection result of the two-dimensional slice. After the feature map of each stage is obtained, there can be a pooling operation performed on the feature map for downsample by two times. A model structure shown in FIG. 6 is merely for illustration, and does not limit a structure of the object detection model. An actual object detection model may include more or fewer components than those shown in FIG. 6, and parameters of the structure included in FIG. 6 may also be different.

Values of variables in the mutual learning module M $(g(I) \cdot D_{obj} + D_{edg})$ are specifically as follows: both g(I) and $D_{edg}$ are results obtained after a convolution operation and upsampling are performed on a feature map outputted at a current stage, and $D_{obj}$ is an object detection result outputted by a pre-trained object detection model. When the object detection model is trained, a loss function may be denoted as $L_{edge}$ for supervised training. In addition, when the loss function is constructed, a loss function may be constructed for each stage. The loss function of each stage is used for training and updating model parameters of the current stage and stages before the current stage, or may be used for training and updating only model parameters of the current stage.

Specifically, the computer device may train the object detection model under supervision according to a training sample (a two-dimensional image) and a training label (an edge detection label) of the training sample and by constructing a supervised training loss function.

In a specific embodiment, the loss function trained under supervision may be a Focal Loss function, and this loss function is specifically shown in the following formula:

$$FL(p) = -\alpha(1-p)^\gamma \log(p) \quad (4)$$

where p is a probability value that a pixel with a label of 1 predicted by a model belongs to a category, $\alpha$ is a weight factor with the label of 1, and $\gamma$ is a regulable focus factor to regulate a regulatory factor $(1-p)^\gamma$. The label of 1 may specifically indicate that the pixel is an edge pixel. Calculation of backpropagation and gradient update of $L_{edge}$ are performed on a total of 6 outputs, which includes an output of each stage after M, an output of a previous stage, and outputs of all stages on which element-wise addition is performed.

For example, referring to FIG. 6, the six outputs include: an output of a first mutual learning module, a result of outputs of the first and second mutual learning modules on which element-wise addition is performed, a result of outputs of the first, the second, and a third mutual learning modules on which element-wise addition is performed, a result of outputs of the first, the second, the third, and a fourth mutual learning modules on which element-wise addition is performed, and a result of outputs of the first, the second, the third, the fourth, and a fifth mutual learning modules on which element-wise addition is performed, and a result of concatenation of outputs of the first, the second, the third, the fourth, and the fifth mutual learning modules.

A pre-trained edge detection model may not include the mutual learning module. That is, element-wise addition is performed on a feature map of each stage on which a convolution operation and upsampling are performed, to obtain an edge detection result of the two-dimensional image.

Figure 4:
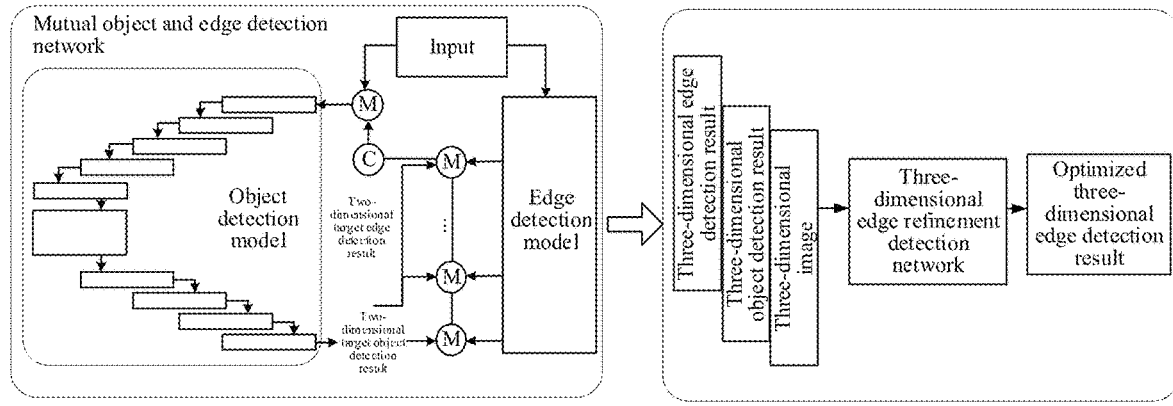
FIG. 4 is a schematic structural diagram of a network to which a method for three-dimensional edge detection is applied according to an embodiment.

In a specific embodiment, still referring to FIG. 4, an input of the mutual object and edge detection network is the two-dimensional slice of the three-dimensional image. Before inputted into the object detection model of the mutual object and edge detection network, the two-dimensional slice is first processed by a mutual learning module. The mutual learning module includes three inputs: the two-dimensional slice of the three-dimensional image, a two-dimensional initial object detection result of the two-dimensional slice, and a two-dimensional initial edge detection result of the two-dimensional slice. The two-dimensional initial object detection result of the two-dimensional slice is obtained by using the object detection model obtained through pre-training, and the two-dimensional initial edge detection result of the two-dimensional slice is obtained by using the edge detection model obtained through pre-training. The three inputs included in the mutual learning module may also be the two-dimensional slice of the three-dimensional image, the two-dimensional initial object detection result of the two-dimensional slice, and an output of the edge detection model in the mutual object and edge detection network. An output of the object detection model in the mutual object and edge detection network is a two-dimensional object detection result of the two-dimensional slice.

In addition, after the two-dimensional slice is inputted into the edge detection model in the mutual object and edge detection network, outputs of the stages of the edge detection model are stacked after being processed by the mutual learning module, and the two-dimensional object detection result of the two-dimensional slice is obtained. The mutual learning module connected after each stage include two inputs: an output of this stage and the two-dimensional initial object detection result of the two-dimensional slice. g(I) and $D_{edg}$ in the mutual learning module $g(i) \cdot D_{obj} + D_{edg}$ are both outputs of this stage, so that there are only two inputs.

A structure of the object detection model obtained through pre-training is the same as that of the object detection model in the mutual object and edge detection network, but model parameters are different. The object detection model in the mutual object and edge detection network is obtained through further training on the basis of the object detection model obtained through pre-training. A structure of the edge detection model obtained through pre-training is the same as that of the edge detection model in the mutual object and edge detection network, but model parameters are different. The edge detection model in the mutual object and edge detection network is obtained through further training on the basis of the edge detection model obtained through pre-training. For a model structure of the object detection model, reference may be made to the model structure shown in FIG. 5, and for a model structure of the edge detection model, reference may be made to the model structure shown in FIG. 6.

When the object detection model and the edge detection model obtained through pre-training are further trained after being associated by the mutual learning module, an input of the mutual learning module connected by the object detection model may be the two-dimensional slice of the three-dimensional image, an output of a pre-trained object detection model, and an output of a pre-trained edge detection model; or, the two-dimensional slice of the three-dimensional image, an output of a pre-trained object detection model, and a real-time output of a current edge detection model. That is, $D_{obj}$ in $g(I) \cdot D_{obj} + D_{edg}$ is a fixed output of a model obtained through pre-training; and $D_{edg}$ in $g(I) \cdot D_{obj} + D_{edg}$ may be a real-time output of a model being trained, or may be a fixed output of a model obtained through pre-training. An input of the mutual learning module connected at each stage of the edge detection model may be a real-time output of each stage and a real-time output of a current object detection model; or, a real-time output of each stage and an output of the pre-trained object detection model. That is, g(I) and $D_{edg}$ in $g(I) \cdot D_{obj} + D_{edg}$ are both real-time outputs of the edge detection model; and $D_{obj}$ in $g(I) \cdot D_{obj} + D_{edg}$ may be a real-time output of a model being trained, or may be a fixed output of a model obtained through pre-training.

After the two-dimensional object detection result and the two-dimensional edge detection result of each two-dimensional slice of the three-dimensional image are obtained, the two-dimensional object detection results may be stacked into a three-dimensional object detection result, and the two-dimensional edge detection results may be stacked into a three-dimensional edge detection result. The three-dimensional image, the three-dimensional object detection result, and the three-dimensional edge detection result are inputted into a three-dimensional edge refinement detection network, to output an optimized three-dimensional edge detection result and a subtle three-dimensional edge map. For a model structure of the three-dimensional edge refinement detection network, reference may be made to the model structure shown in FIG. 2.

It may be understood that a two-dimensional convolutional neural network can learn a rich texture, structure, and other features of an image from two-dimensional data, and a three-dimensional convolutional neural network can learn spatial structure continuity related information from three-dimensional data, which are complementary to each other. In addition, there are some similarities between an edge detection task and an object detection task, and these two tasks may also learn and promote each other. Based on the above considerations, in the embodiments provided in this disclosure, associative learning of multi-level and multi-scale features in two-dimensional and three-dimensional data is implemented to accurately detect a three-dimensional object edge. A network structure involved in the embodiments provided in this disclosure includes two stages. The first stage is a mutual object and edge detection network. This stage focuses on learning a rich structure, texture, edge, and semantic features of an object in a single two-dimensional image. The second stage is a three-dimensional edge refinement detection network, which combines object and edge detection results learned in the previous stage to further learn a consecutive and subtle three-dimensional object edge. In this way, in the embodiments provided in this disclosure, a three-dimensional edge that fits a real edge of a three-dimensional object can be accurately detected.

In addition, the computer device further performs test comparison on the method for three-dimensional edge detection of the embodiments of this disclosure and a plurality of related edge detection algorithms. The related edge detection algorithms are as follows: Holistically-Nested Edge Detection (HED); Richer Convolutional Features (RCF) for Edge Detection; and Bi-Directional Cascade Network (BDCN) for Perceptual Edge Detection.

Figure 7:
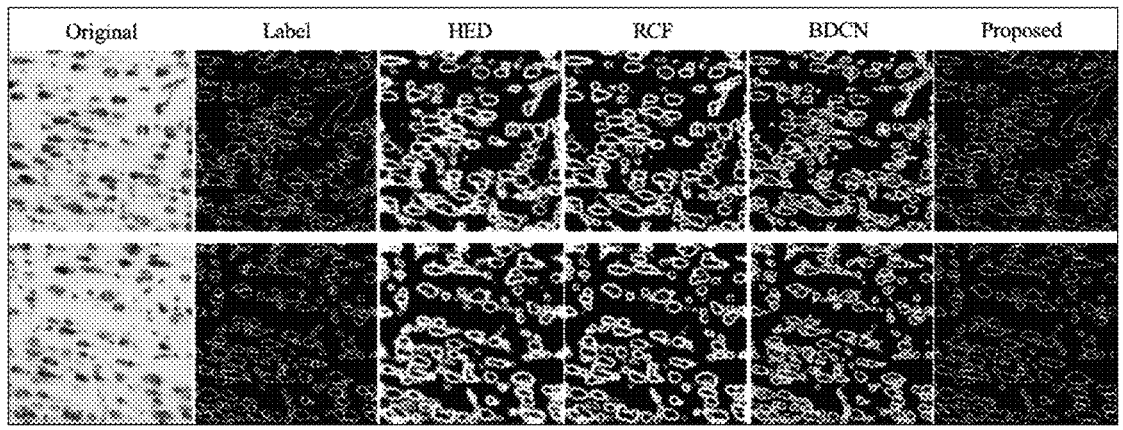
FIG. 7 is a comparison diagram of detection results of a plurality of methods for three-dimensional edge detection according to an embodiment.

In a specific embodiment, FIG. 7 is a comparison diagram of detection results obtained by a method for three-dimensional edge detection provided in this embodiment of this disclosure and detection results obtained by other edge detection algorithms, including one of two-dimensional slices in a three-dimensional image, a boundary detection label, a detection result of a first related edge detection algorithm (HED), a detection result of a second related edge detection algorithm (RCF), a detection result of a third related edge detection algorithm (BDCN), and a detection result of the method (Proposed) for three-dimensional edge detection of this application. It can be learned from FIG. 7 that the detection result of the method for three-dimensional edge detection provided in this embodiment of this disclosure is more refined and closer to a real edge of an object. Although the related HED, RCF, and BDCN algorithms can accurately detect an edge of an object to different degrees, edge detection results of the above algorithms are relatively rough and cannot fit the real edge.

Figure 8:
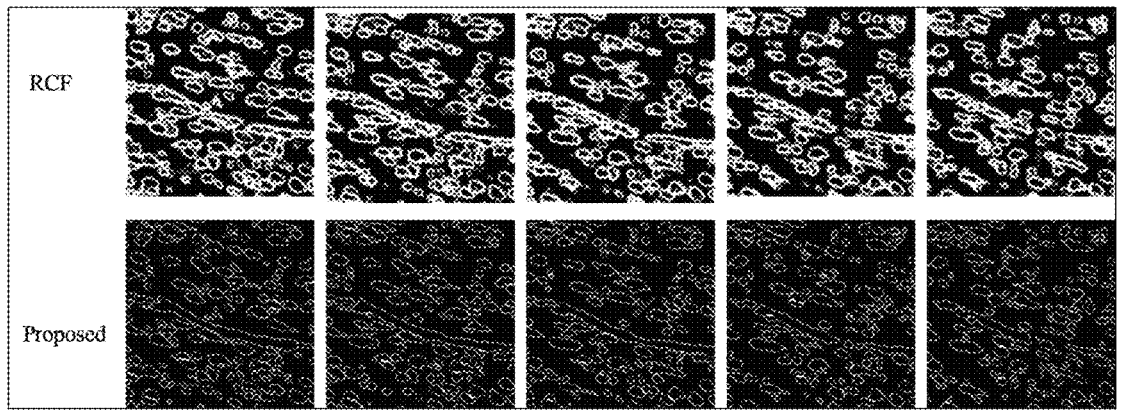
FIG. 8 is a comparison diagram of continuity of detection results of two methods for three-dimensional edge detection according to an embodiment.

In a specific embodiment, FIG. 8 is a comparison diagram of edge detection results of five consecutive two-dimensional slices during edge detection in a method for three-dimensional edge detection provided in this embodiment of this disclosure and edge detection results of a two-dimensional edge detection algorithm RCF on the same five two-dimensional slices. It can be learned from FIG. 8 that the detection result of the method for three-dimensional edge detection provided in this embodiment of this disclosure has good continuity. This is because in the method for three-dimensional edge detection provided in this embodiment of this disclosure, information that is easily missed in the two-dimensional edge detection algorithm can be completed by learning the direct spatial continuity of different images.

In addition, the computer device further compares the experimental results on edge detection indexes based on the method for three-dimensional edge detection of the embodiments of this disclosure and the related edge detection algorithms (HED and RCF).

TABLE 1

|  | ODSR | ODSP | ODSF | OISR | OISP | OISF |
|---|---|---|---|---|---|---|
| HED | 0.5598 | 0.883 | 0.6852 | 0.567 | 0.8854 | 0.6913 |
| RCF | 0.7068 | 0.9941 | 0.8084 | 0.7115 | 0.9457 | 0.812 |
| Proposed | 0.7593 | 0.9549 | 0.846 | 0.7597 | 0.9553 | 0.8463 |

Table 1 compares the experimental results between the method for three-dimensional edge detection provided in the embodiments of this disclosure and the related two-dimensional edge detection algorithms HED and RCF on edge detection indexes ODS (R\P\F) and OIS (R\P\F). It can be seen from Table 1 that the method for three-dimensional edge detection provided in this embodiment of this disclosure is superior to the related two-dimensional edge detection algorithm in each edge detection measurement index.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this disclosure, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

Figure 9:
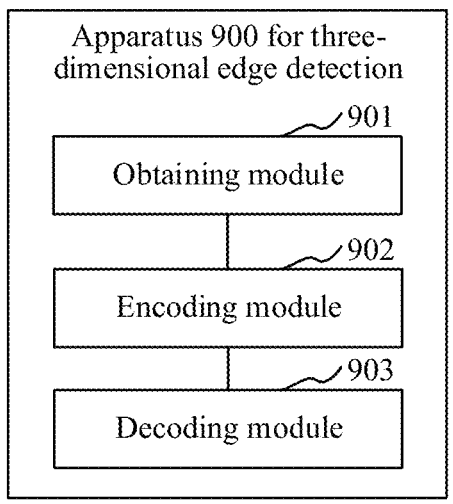
FIG. 9 is a structural block diagram of an apparatus for three-dimensional edge detection according to an embodiment.

As shown in FIG. 9, in an embodiment, an apparatus 900 for three-dimensional edge detection is provided. Referring to FIG. 9, the apparatus 900 for three-dimensional edge detection may include: an obtaining module 901, an encoding module 902, and a decoding module 903. All or some of the modules included in the apparatus for three-dimensional edge detection may be implemented by software, processing circuitry, or a combination thereof.

The obtaining module 901 is configured to obtain a two-dimensional object detection result and a two-dimensional edge detection result of each two-dimensional slice of a three-dimensional image; and stack the two-dimensional object detection results into a three-dimensional object detection result, and stack the two-dimensional edge detection results into a three-dimensional edge detection result.

The encoding module 902 is configured to perform encoding according to a feature map of the three-dimensional image, the three-dimensional object detection result, and the three-dimensional edge detection result, to obtain an encoding result.

The decoding module 903 is configured to perform decoding according to the encoding result, the three-dimensional object detection result, and the three-dimensional edge detection result, to obtain an optimized three-dimensional edge detection result of the three-dimensional image.

In an embodiment, the encoding module 902 is further configured to perform more than one encoding operation according to the feature map of the three-dimensional image, the three-dimensional object detection result, and the three-dimensional edge detection result, an input of each encoding being an operation result of an operation performed on an output of a previous encoding by using the three-dimensional object detection result and the three-dimensional edge detection result, and outputs of the encodings being different and being feature maps of the three-dimensional image; and obtain a feature map outputted after a last encoding to obtain the encoding result.

In an embodiment, the encoding module 902 is further configured to perform a first dot product operation on a color feature map of the three-dimensional image and the three-dimensional object detection result, add the result of the first dot product operation with the three-dimensional edge detection result, and then perform a current encoding operation; and perform a second dot product operation on an output of the current encoding and the three-dimensional object detection result, add the result of the second dot product operation with the three-dimensional edge detection result, and then perform a next encoding operation, until the last encoding operation.

In an embodiment, the decoding module 903 is further configured to perform more than one decoding operation according to the encoding result, the three-dimensional object detection result, and the three-dimensional edge detection result, an input of each decoding operation including an operation result of an operation performed on an output of a previous decoding by using the three-dimensional object detection result and the three-dimensional edge detection result; and obtain an output of a last decoding, to obtain the optimized three-dimensional edge detection result of the three-dimensional image.

Figure 10:
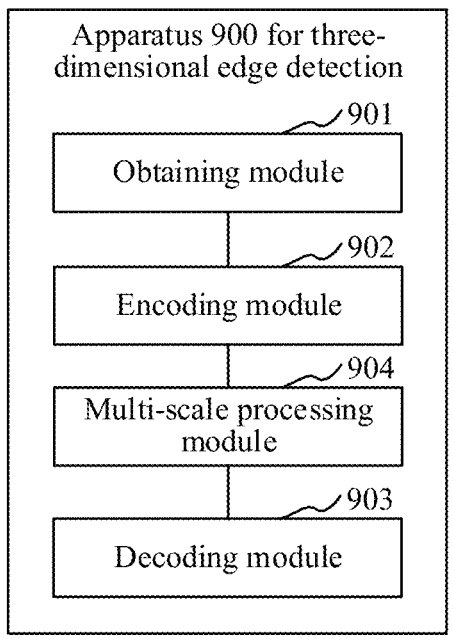
FIG. 10 is a structural block diagram of an apparatus for three-dimensional edge detection according to another embodiment.

As shown in FIG. 10, in an embodiment, the apparatus 900 for three-dimensional edge detection further includes a multi-scale processing module 904 configured to process the encoding result by using plural atrous convolutions with different sampling rates to obtain plural feature maps, the plural feature maps being of different sizes; and perform a convolution operation after the plural feature maps are connected, to obtain a multi-scale learning result. The decoding module 903 is further configured to perform more than one decoding operation according to the multi-scale learning result, the three-dimensional object detection result, and the three-dimensional edge detection result. The multi-scale processing module 904 can be implemented by processing circuitry, software, or a combination thereof.

In an embodiment, the decoding module 903 is further configured to perform a first dot product operation on the multi-scale learning result and the three-dimensional object detection result, add the result of the first dot product operation with the three-dimensional edge detection result, and then perform a current decoding operation with an output of an intermediate encoding; and perform a second dot product operation on an output of the current decoding operation and the three-dimensional object detection result, add the result of the second dot product operation with the three-dimensional edge detection result, and then perform a next encoding operation with an output of an encoding operation prior to the intermediate encoding operation until a last decoding operation.

In an embodiment, the obtaining module 901 is further configured to obtain a two-dimensional initial object detection result and a two-dimensional initial edge detection result of each two-dimensional slice of the three-dimensional image; perform, for each two-dimensional slice of the three-dimensional image, a dot product operation on a color feature map of the two-dimensional slice and the two-dimensional initial object detection result of the two-dimensional slice, and add the result of the dot product operation with the two-dimensional initial object detection result of the two-dimensional slice to perform object detection, to obtain a two-dimensional object detection result of the two-dimensional slice; and perform a convolution operation on each two-dimensional slice of the three-dimensional image, and obtain a two-dimensional edge detection result of each two-dimensional slice according to an output of the convolution operation and a two-dimensional object detection result of a corresponding two-dimensional slice.

In an embodiment, the obtaining module 901 is further configured to respectively perform the following operations on each two-dimensional slice of the three-dimensional image: perform a dot product operation on the color feature map of the two-dimensional slice and the two-dimensional initial object detection result of the two-dimensional slice, and add the result of the dot product operation with the two-dimensional initial object detection result of the two-dimensional slice to generate to-be-processed data; and perform more than one encoding operation and more than one decoding operation on the to-be-processed data, to obtain the two-dimensional object detection result of the two-dimensional slice outputted after a last decoding operation.

In an embodiment, the obtaining module 901 is further configured to perform more than one encoding operation on the to-be-processed data, to obtain an object detection encoding result outputted after the last encoding; process the object detection encoding result by using more than one atrous convolution with different sampling rates to obtain more than one feature map, the more than one feature map being of different sizes; perform a convolution operation after the more than one feature map is connected, to obtain a multi-scale learning result; and perform more than one decoding operation on the multi-scale learning result, to obtain the two-dimensional object detection result of the two-dimensional slice outputted after the last decoding operation.

In an embodiment, the obtaining module 901 is further configured to respectively perform the following operations on each two-dimensional slice of the three-dimensional image: perform a convolution operation of more than one stage on the two-dimensional slice; perform a dot product operation on an output of each stage and the two-dimensional initial object detection result of the two-dimensional slice, and add the result of the dot product operation with an output of a current stage to obtain a stage detection result;

and combine the stage detection results to obtain the two-dimensional edge detection result of the two-dimensional slice.

In the foregoing apparatus for three-dimensional edge detection, after the two-dimensional object detection result and the two-dimensional edge detection result of each two-dimensional slice of the three-dimensional image are obtained, the three-dimensional object detection result and the three-dimensional edge detection result are stacked, encoding is performed according to the feature map of the three-dimensional image, the three-dimensional object detection result and the three-dimensional edge detection result, and decoding is performed with reference to the three-dimensional object detection result and the three-dimensional edge detection result, to obtain the optimized three-dimensional edge detection result of the three-dimensional image. In this way, when three-dimensional edge detection is performed on the three-dimensional image, the two-dimensional detection result of each two-dimensional slice of the three-dimensional image is used in the three-dimensional edge detection, so that a feature of the two-dimensional detection result and a spatial structure of three-dimensional data are complemented with each other skillfully and continuously. In addition, the two-dimensional detection result includes two detection results: object detection and edge detection. The two detection results can also learn from each other and promote each other, thereby further improving the accuracy of three-dimensional edge detection.

Figure 11:
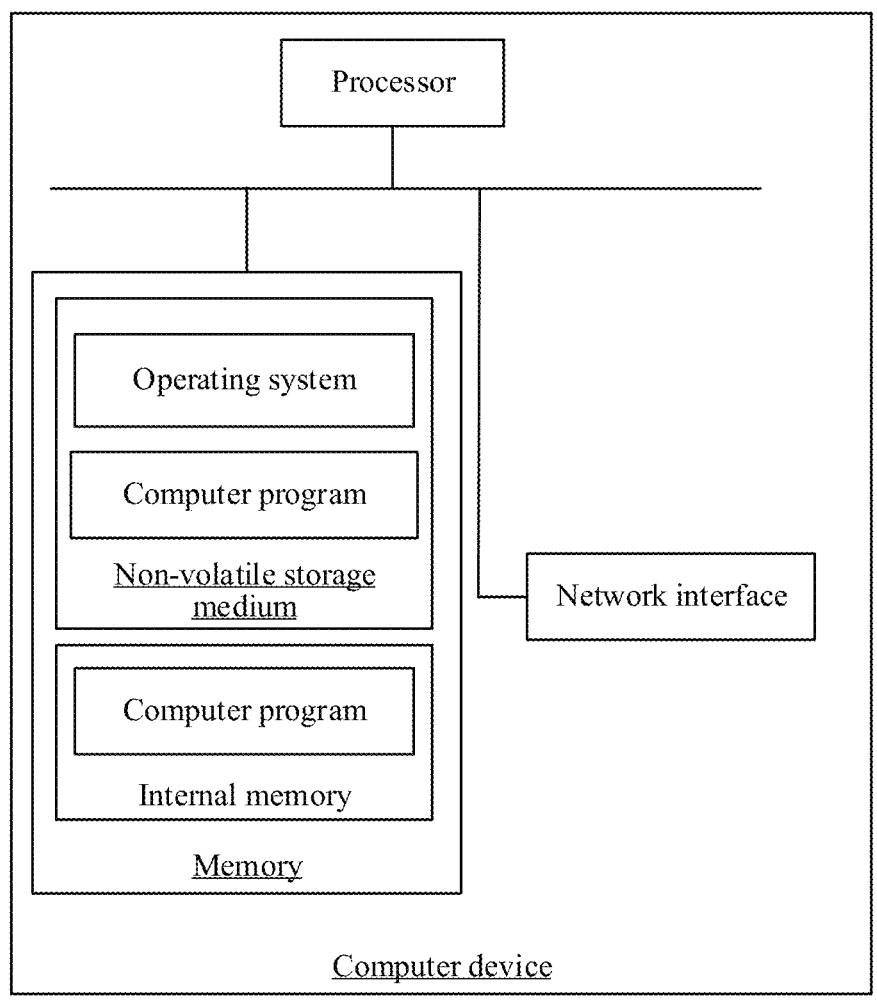
FIG. 11 is a structural block diagram of a computer device according to an embodiment.

FIG. 11 is a diagram of an internal structure of a computer device in an embodiment. As shown in FIG. 11, the computer device includes processing circuitry (e.g., a processor), a memory (e.g., a non-transitory computer-readable storage medium), and a network interface connected by a system bus. The memory includes a non-volatile storage medium and an internal memory. The non-volatile storage medium of the computer device stores an operating system and may further store a computer program. The computer program, when executed by the processor, may cause the processor to implement the method for three-dimensional edge detection. The internal memory may also store a computer program. The computer program, when executed by the processor, may cause the processor to perform the method for three-dimensional edge detection. A person skilled in the art may understand that, the structure shown in FIG. 11 is only a block diagram of a part of a structure correlated to a solution of this disclosure and does not limit the computer device to which the solution of this disclosure is applied. Specifically, the computer device may include more or fewer members than those in the drawings, or include a combination of some members, or include different member layouts.

In an embodiment, the apparatus for three-dimensional edge detection provided in this disclosure may be implemented in a form of a computer program, and the computer program may run on the computer device shown in FIG. 11. The memory of the computer device may store program modules forming the apparatus for three-dimensional edge detection, for example, the obtaining module 901, the encoding module 902, and the decoding module 903 shown in FIG. 9. The computer program formed by the program modules causes the processor to perform the steps in the method for three-dimensional edge detection in the embodiments of this disclosure described in this specification.

For example, the computer device shown in FIG. 11 may perform, by using the obtaining module 901 in the apparatus for three-dimensional edge detection shown in FIG. 9, a step of obtaining a two-dimensional object detection result and a two-dimensional edge detection result of each two-dimensional slice of a three-dimensional image; and stacking the two-dimensional object detection results into a three-dimensional object detection result, and stacking the two-dimensional edge detection results into a three-dimensional edge detection result; perform, by using the encoding module 902, a step of performing encoding according to a feature map of the three-dimensional image, the three-dimensional object detection result, and the three-dimensional edge detection result, to obtain an encoding result; and perform, by using the decoding module 903, a step of performing decoding according to the encoding result, the three-dimensional object detection result, and the three-dimensional edge detection result, to obtain an optimized three-dimensional edge detection result of the three-dimensional image.

In an embodiment, a computer device is provided, including a processor and a memory. The memory stores a computer program, the computer program, when executed by the processor, causes the processor to perform the steps of the method for three-dimensional edge detection. Herein, the steps of the method for three-dimensional edge detection may be the steps of the method for three-dimensional edge detection in the foregoing embodiments.

In an embodiment, a computer-readable storage medium is provided, storing a computer program, the computer program, when being executed by a processor, causes the processor to perform the steps of the foregoing method for three-dimensional edge detection. Herein, the steps of the method for three-dimensional edge detection may be the steps of the method for three-dimensional edge detection in the foregoing embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be combined in different ways. For concise description, not all possible combinations of the technical features in the embodiments are described. However, provided that combinations of the technical features do not conflict with each other, the combinations of the technical features are considered as falling within the scope described in this specification.

The foregoing embodiments only show several implementations of this disclosure, and descriptions thereof are in detail, but are not to be understood as a limitation to the patent scope of this disclosure. A person of ordinary skill in the art may further make variations and improvements without departing from the ideas of this disclosure, which fall within the protection scope of this disclosure.

What is claimed is:

1. A method for three-dimensional edge detection, the method comprising: obtaining, for each of plural two-dimensional slices of a three-dimensional image, a two-dimensional object detection result and a two-dimensional edge detection result; stacking the two-dimensional object detection results into a three-dimensional object detection result, and stacking the two-dimensional edge detection results into a three-dimensional edge detection result E;
performing more than one encoding operation according to a feature map F of the three-dimensional image, the three-dimensional object detection result, and the three-dimensional edge detection result, to obtain an encoding result by
performing a first dot product operation $\otimes$ on the feature map of the three-dimensional image and the three-dimensional object detection result which is F$\otimes$E, adding a result of the first dot product operation to the three-dimensional edge detection result, and performing a current encoding operation of the result of the first dot product operation added with the three-dimensional edge detection result; and
performing a second dot product operation on an output of the current encoding operation and the three-dimensional object detection result, adding a result of the second dot product operation to the three-dimensional edge detection result, and performing a next encoding operation of the second dot product operation added with the three-dimensional edge detection result, the more than one encoding operation that includes the current encoding operation and the next encoding operation being performed until a last encoding operation of the more than one encoding operation; and
performing, by processing circuitry of a computer device, decoding according to the encoding result, the three-dimensional object detection result, and the three-dimensional edge detection result, to obtain an optimized three-dimensional edge detection result of the three-dimensional image.

2. The method according to claim 1, wherein
an input of each of the more than one encoding operation is based on an output of a previous encoding operation of the more than one encoding operation when the more than one encoding operation includes the previous encoding operation of the respective encoding operation, outputs of the more than one encoding operation are different and correspond to feature maps of the three-dimensional image, and the input of a first encoding operation in the more than one encoding operation is based on the feature map F of the three-dimensional image, the first encoding operation including the first dot product operation; and
the method includes obtaining an output feature map outputted after the last encoding operation to obtain the encoding result.

3. The method according to claim 1, wherein the performing the decoding comprises:
performing more than one decoding operation according to the encoding result, the three-dimensional object detection result, and the three-dimensional edge detection result, an input of each decoding operation being based on an output of a previous decoding operation; and
obtaining an output of a last decoding operation, to obtain the optimized three-dimensional edge detection result of the three-dimensional image.

4. The method according to claim 3, wherein the method includes:
processing the encoding result by using plural atrous convolutions with different sampling rates to obtain plural feature maps, the plural feature maps being of different sizes; and
performing a convolution operation after the plural feature maps are connected, to obtain a multi-scale learning result; and
the performing the more than one decoding operation comprises:
performing the more than one decoding operation according to the multi-scale learning result, the three-dimensional object detection result, and the three-dimensional edge detection result.

5. The method according to claim 4, wherein the performing the more than one decoding operation according to the multi-scale learning result, the three-dimensional object detection result, and the three-dimensional edge detection result comprises:
performing a first dot product operation on the multi-scale learning result and the three-dimensional object detection result, adding a result of the first dot product operation on the multi-scale learning result and the three-dimensional object detection result to the three-dimensional edge detection result, and performing a current decoding operation with an output of an intermediate encoding operation; and
performing a second dot product operation on an output of the current decoding operation and the three-dimensional object detection result, adding a result of the second dot product operation to the three-dimensional edge detection result, and performing a next decoding operation with an output of an encoding operation prior to the intermediate encoding operation until a last decoding operation.

6. The method according to claim 1, wherein the obtaining comprises:
obtaining a two-dimensional initial object detection result and a two-dimensional initial edge detection result of each of the plural two-dimensional slices of the three-dimensional image;
performing, for each of the plural two-dimensional slices of the three-dimensional image, a dot product operation on a color feature map of the two-dimensional slice and the two-dimensional initial object detection result of the two-dimensional slice, adding a result of the dot product operation to the two-dimensional initial object detection result of the two-dimensional slice, and performing object detection to obtain the two-dimensional object detection result of the two-dimensional slice; and
performing a convolution operation on each two-dimensional slice of the three-dimensional image, and obtaining the two-dimensional edge detection result of each two-dimensional slice according to an output of the convolution operation and the two-dimensional object detection result of a corresponding two-dimensional slice.

7. The method according to claim 6, wherein the performing, for each of the plural two-dimensional slices of the three-dimensional image, the dot product operation comprises:
for each of the plural two-dimensional slices of the three-dimensional image,
performing the dot product operation on the color feature map of the two-dimensional slice and the two-dimensional initial object detection result of the two-dimensional slice, and adding a result of the dot product operation to the two-dimensional initial object detection result of the two-dimensional slice to generate to-be-processed data; and
performing more than one encoding operation and more than one decoding operation on the to-be-processed data, to obtain the two-dimensional object detection result of the two-dimensional slice outputted after a last decoding operation.

8. The method according to claim 7, wherein
the performing the more than one encoding operation comprises performing the more than one encoding operation on the to-be-processed data, to obtain an object detection encoding result outputted after a last encoding operation;
the method further comprises:
processing the object detection encoding result by using plural atrous convolutions with different sampling rates to obtain plural feature maps, the plural feature maps being of different sizes; and
performing a convolution operation after the plural feature maps are connected, to obtain a multi-scale learning result; and
the performing the more than one decoding operation comprises performing the more than one decoding operation on the multi-scale learning result, to obtain the two-dimensional object detection result of the two-dimensional slice outputted after the last decoding operation.

9. The method according to claim 6, wherein the performing the convolution operation on each two-dimensional slice of the three-dimensional image, and obtaining the two-dimensional edge detection result of each two-dimensional slice comprises:
for each two-dimensional slice of the three-dimensional image,
performing plural convolution operation stages on the two-dimensional slice;
performing a dot product operation on an output of each convolution operation stage and the two-dimensional initial object detection result of the two-dimensional slice, and adding a result of the dot product operation on the output of each convolution operation stage and the two-dimensional initial object detection result to an output of the respective convolution operation stage to obtain a stage detection result; and
combining the stage detection results to obtain the two-dimensional edge detection result of the two-dimensional slice.

10. An apparatus for three-dimensional edge detection, comprising:
processing circuitry configured to obtain, for each of plural two-dimensional slices of a three-dimensional image, a two-dimensional object detection result and a two-dimensional edge detection result;
stack the two-dimensional object detection results into a three-dimensional object detection result O, and stack the two-dimensional edge detection results into a three-dimensional edge detection result E;
perform more than one encoding operation according to a feature map F of the three-dimensional image, the three-dimensional object detection result, and the three-dimensional edge detection result, to obtain an encoding result by
performing a first dot product operation $\otimes$ on the feature map of the three-dimensional image and the three-dimensional object detection result which is $F \otimes E$, adding a result of the first dot product operation to the three-dimensional edge detection result, and performing a current encoding operation of the result of the first dot product operation added with the three-dimensional edge detection result; and
performing a second dot product operation on an output of the current encoding operation and the three-dimensional object detection result, adding a result of the second dot product operation to the three-dimensional edge detection result, and performing a next encoding operation of the second dot product operation added with the three-dimensional edge detection result, the more than one encoding operation that includes the current encoding operation and the next encoding operation being performed until a last encoding operation of the more than one encoding operation; and
perform decoding according to the encoding result, the three-dimensional object detection result, and the three-dimensional edge detection result, to obtain an optimized three-dimensional edge detection result of the three-dimensional image.

11. The apparatus according to claim 10, wherein
an input of each of the more than one encoding operation is based on an output of a previous encoding operation of the more than one encoding operation when the more than one encoding operation includes the previous encoding operation of the respective encoding operation, outputs of the more than one encoding operation are different and correspond to feature maps of the three-dimensional image, and the input of a first encoding operation in the more than one encoding operation is based on the feature map F of the three-dimensional image, the first encoding operation including the first dot product operation; and
the processing circuitry is further configured to obtain an output feature map outputted after the last encoding operation to obtain the encoding result.

12. The apparatus according to claim 10, wherein the processing circuitry is further configured to:
perform more than one decoding operation according to the encoding result, the three-dimensional object detection result, and the three-dimensional edge detection result, an input of each decoding operation being based on an output of a previous decoding operation; and
obtain an output of a last decoding operation, to obtain the optimized three-dimensional edge detection result of the three-dimensional image.

13. The apparatus according to claim 12, wherein the processing circuitry is further configured to:

process the encoding result by using plural atrous convolutions with different sampling rates to obtain plural feature maps, the plural feature maps being of different sizes;

perform a convolution operation after the plural feature maps are connected, to obtain a multi-scale learning result; and perform the more than one decoding operation according to the multi-scale learning result, the three-dimensional object detection result, and the three-dimensional edge detection result.

14. The apparatus according to claim 13, wherein the processing circuitry is further configured to:

perform a first dot product operation on the multi-scale learning result and the three-dimensional object detection result, add a result of the first dot product operation on the multi-scale learning result and the three-dimensional object detection result to the three-dimensional edge detection result, and perform a current decoding operation with an output of an intermediate encoding operation; and perform a second dot product operation on an output of the current decoding operation and the three-dimensional object detection result, add a result of the second dot product operation to the three-dimensional edge detection result, and perform a next decoding operation with an output of an encoding operation prior to the intermediate encoding operation until the last decoding operation.

15. The apparatus according to claim 10, wherein the processing circuitry is further configured to:

obtain a two-dimensional initial object detection result and a two-dimensional initial edge detection result of each of the plural two-dimensional slices of the three-dimensional image;

perform, for each of the plural two-dimensional slices of the three-dimensional image, a dot product operation on a color feature map of the two-dimensional slice and the two-dimensional initial object detection result of the two-dimensional slice, and add a result of the dot product operation to the two-dimensional initial object detection result of the two-dimensional slice, and perform object detection to obtain the two-dimensional object detection result of the two-dimensional slice; and perform a convolution operation on each two-dimensional slice of the three-dimensional image, and obtain the two-dimensional edge detection result of each two-dimensional slice according to an output of the convolution operation and the two-dimensional object detection result of a corresponding two-dimensional slice.

16. The apparatus according to claim 15, wherein the processing circuitry is further configured to:

for each of the plural two-dimensional slices of the three-dimensional image, perform the dot product operation on the color feature map of the two-dimensional slice and the two-dimensional initial object detection result of the two-dimensional slice, and add a result of the dot product operation to the two-dimensional initial object detection result of the two-dimensional slice to generate to-be-processed data; and perform more than one encoding operation and more than one decoding operation on the to-be-processed data, to obtain the two-dimensional object detection result of the two-dimensional slice outputted after a last decoding operation.

17. The apparatus according to claim 16, wherein the processing circuitry is further configured to:

perform the more than one encoding operation on the to-be-processed data, to obtain an object detection encoding result outputted after the last encoding operation;

process the object detection encoding result by using plural atrous convolutions with different sampling rates to obtain plural feature maps, the plural feature maps being of different sizes;

perform a convolution operation after the plural feature maps are connected, to obtain a multi-scale learning result; and perform the more than one decoding operation on the multi-scale learning result, to obtain the two-dimensional object detection result of the two-dimensional slice outputted after the last decoding operation.

18. A non-transitory computer-readable storage medium storing computer-readable instructions, which, when executed by one or more processors, cause the one or more processors to perform:

obtaining, for each of plural two-dimensional slices of a three-dimensional image, a two-dimensional object detection result and a two-dimensional edge detection result;

stacking the two-dimensional object detection results into a three-dimensional object detection result O, and stacking the two-dimensional edge detection results into a three-dimensional edge detection result E;

performing more than one encoding operation according to a feature map F of the three-dimensional image, the three-dimensional object detection result, and the three-dimensional edge detection result, to obtain an encoding result by performing a first dot product operation $\otimes$ on the feature map of the three-dimensional image and the three-dimensional object detection result which is F$\otimes$E, adding a result of the first dot product operation to the three-dimensional edge detection result, and performing a current encoding operation of the result of the first dot product operation added with the three-dimensional edge detection result; and performing a second dot product operation on an output of the current encoding operation and the three-dimensional object detection result, adding a result of the second dot product operation to the three-dimensional edge detection result, and performing a next encoding operation of the second dot product operation added with the three-dimensional edge detection result, the more than one encoding operation that includes the current encoding operation and the next encoding operation being performed until a last encoding operation of the more than one encoding operation; and performing decoding according to the encoding result, the three-dimensional object detection result, and the three-dimensional edge detection result, to obtain an optimized three-dimensional edge detection result of the three-dimensional image.

* * * * *